United States Patent
Yadav et al.

(10) Patent No.: US 11,080,146 B2
(45) Date of Patent: Aug. 3, 2021

(54) SYSTEM AND METHOD FOR STORAGE UNAVAILABILITY TOLERANT BACKUP

(71) Applicant: EMC IP Holding Company LLC, Hopkinton, MA (US)

(72) Inventors: Sunil Yadav, Bangalore (IN); Aaditya Rakesh Bansal, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/656,945

(22) Filed: Oct. 18, 2019

(65) Prior Publication Data

US 2021/0117278 A1 Apr. 22, 2021

(51) Int. Cl.
*G06F 11/14* (2006.01)

(52) U.S. Cl.
CPC ...... *G06F 11/1461* (2013.01); *G06F 11/1451* (2013.01); *G06F 11/1464* (2013.01); *G06F 11/1469* (2013.01)

(58) Field of Classification Search
CPC .................... G06F 11/1461; G06F 11/1451
See application file for complete search history.

(56) References Cited

U.S. PATENT DOCUMENTS

| | | | |
|---|---|---|---|
| 6,745,210 B1 | 6/2004 | Scanlan et al. | |
| 8,554,918 B1 | 10/2013 | Douglis | |
| 9,798,629 B1 | 10/2017 | Shilane et al. | |
| 9,977,704 B1 | 5/2018 | Chopra et al. | |
| 10,089,144 B1 | 10/2018 | Nagpal et al. | |
| 10,102,080 B1 | 10/2018 | Gruszka et al. | |
| 10,616,127 B1 | 4/2020 | Suit | |
| 2007/0136541 A1 | 6/2007 | Herz et al. | |
| 2009/0271485 A1* | 10/2009 | Sawyer | G06F 3/061 709/206 |
| 2013/0085995 A1 | 4/2013 | Mostachetti et al. | |
| 2014/0279912 A1* | 9/2014 | Anglin | G06F 11/1458 707/640 |
| 2015/0096011 A1 | 4/2015 | Watt | |
| 2016/0306564 A1 | 10/2016 | Cheng et al. | |
| 2016/0342403 A1 | 11/2016 | Zamir | |
| 2017/0010941 A1 | 1/2017 | Shimada | |
| 2017/0075765 A1 | 3/2017 | Chen | |
| 2017/0132089 A1 | 5/2017 | Roehrsheim et al. | |
| 2017/0357550 A1* | 12/2017 | Jain | G06F 11/1451 |

(Continued)

*Primary Examiner* — Edward J Dudek, Jr.
(74) *Attorney, Agent, or Firm* — Chamberlain, Hrdlicka, White, Williams & Aughtry

(57) ABSTRACT

Systems, devices, and methods for reducing the impact of temporary unavailability of storages in a backup storage system. The system may store different types of backups depending on the availability storages. The first type of backup, which may rely on a previous backup stored in a first storage that is available for restoration purposes, may be stored on the first storage. When the first storage becomes temporarily unavailable, a second type of backup may be stored in a second storage that is available that requires a previous backup stored in the temporarily unavailable first storage for restoration purposes. The second type of backup may be chained to the previous backup stored in the temporarily unavailable storage. The second type of backup may be converted to the first type of backup when the first storage becomes available again in a computationally efficient manner.

20 Claims, 15 Drawing Sheets

(56) References Cited

U.S. PATENT DOCUMENTS

| | | |
|---|---|---|
| 2017/0364415 A1 | 12/2017 | Formato et al. |
| 2018/0095816 A1 | 4/2018 | Fang et al. |
| 2018/0314457 A1 | 11/2018 | Bender et al. |
| 2019/0278661 A1 | 9/2019 | Mehta et al. |
| 2019/0278663 A1 | 9/2019 | Mehta et al. |
| 2020/0019319 A1 | 1/2020 | Cheng et al. |
| 2020/0019470 A1 | 1/2020 | Wolfson et al. |
| 2020/0264919 A1 | 8/2020 | Vukovic |
| 2020/0334199 A1 | 10/2020 | Wolfson et al. |
| 2020/0364112 A1 | 11/2020 | Mehta et al. |
| 2020/0387321 A1 | 12/2020 | Bansal et al. |

\* cited by examiner

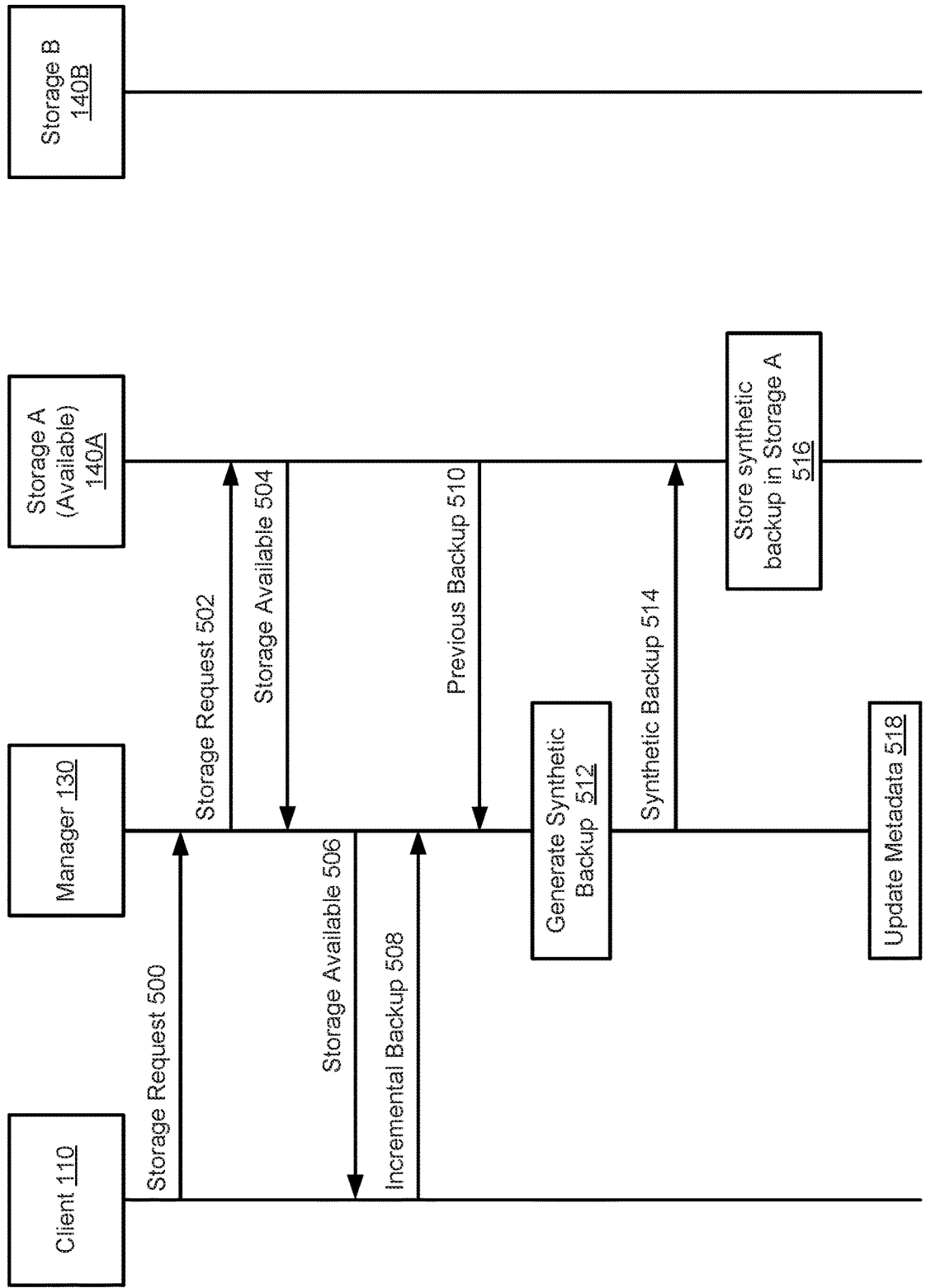

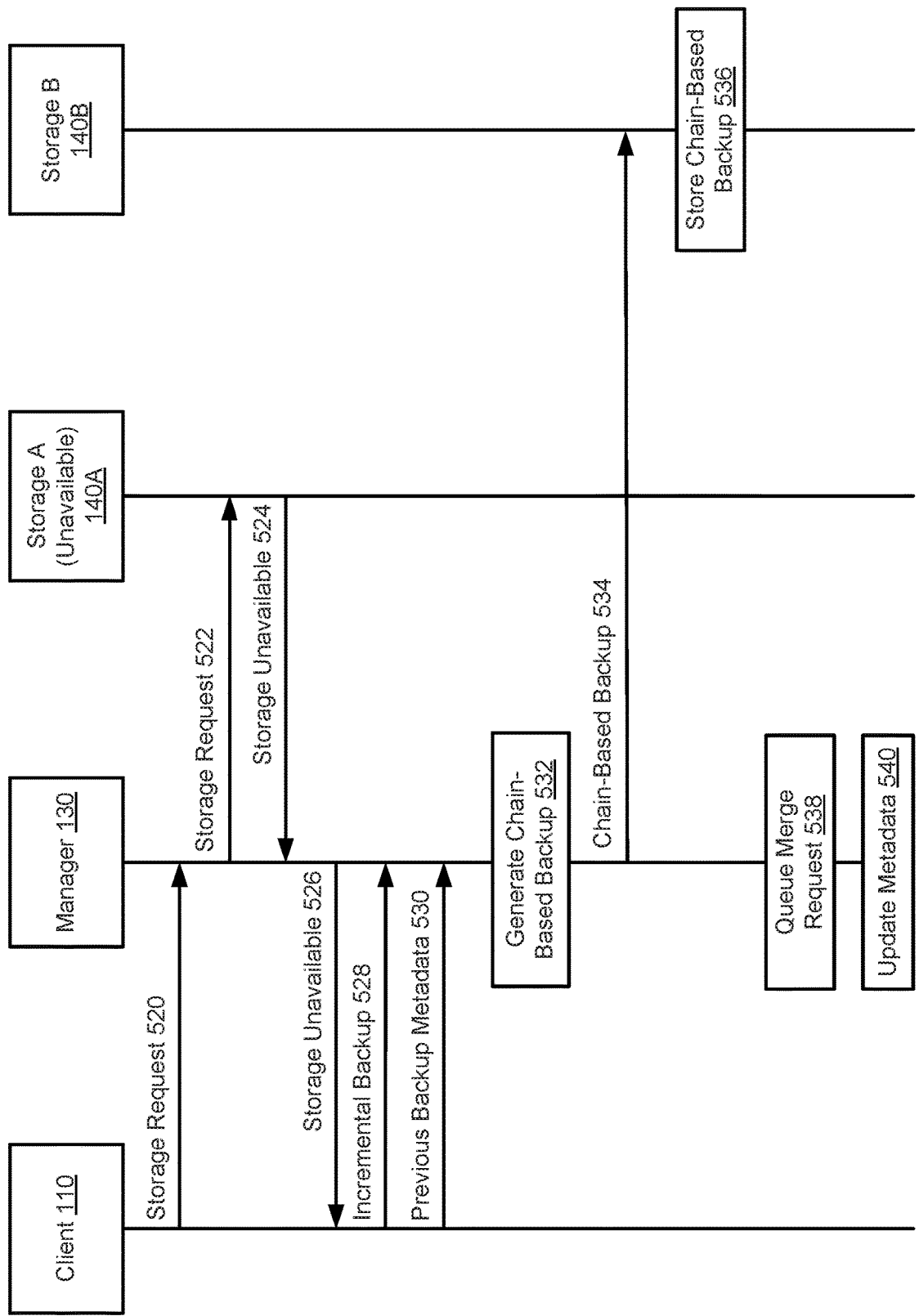

SYSTEM AND METHOD FOR STORAGE UNAVAILABILITY TOLERANT BACKUP

BACKGROUND

Devices may generate information based on existing information. For example, devices may obtain information and derive information based on the obtained information. To obtain information, devices may be able to communicate with other devices. The communications between the devices may be through any means.

SUMMARY

In one aspect, a manager of a backup storage system including persistent storage and a data manager. The persistent storage stores metadata that associates clients with storages. The data manager initiates a backup generation for a client of the clients, wherein the client is associated with a first storage of the storages by the metadata, after the backup is initiated, makes a determination that the first storage is unavailable, and in response to the determination, stores, using the metadata, a chain-based backup for the client in a second storage of the storages that is available to complete the backup generation.

In one aspect, a method for operating a manager of a backup storage system including initiating a backup generation for a client of clients, wherein the client is associated with a first storage of storages by metadata that associates the clients with the storages, after initiating the backup, making a determination that the first storage is unavailable, in response to the determination, storing, using the metadata, a chain-based backup for the client in a second storage of the storages that is available to complete the backup generation.

In one aspect, a non-transitory computer readable medium including computer readable program code, which when executed by a computer processor enables the computer processor to perform a method for operating a manager for a backup storage system. The method includes initiating a backup generation for a client of clients, wherein the client is associated with a first storage of storages by metadata that associates the clients with the storages, after initiating the backup, making a determination that the first storage is unavailable, in response to the determination, storing, using the metadata, a chain-based backup for the client in a second storage of the storages that is available to complete the backup generation.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIGS. 5B-5D show diagrams of actions performed by the example system of FIG. 5A over time.

DETAILED DESCRIPTION

Figure 1:
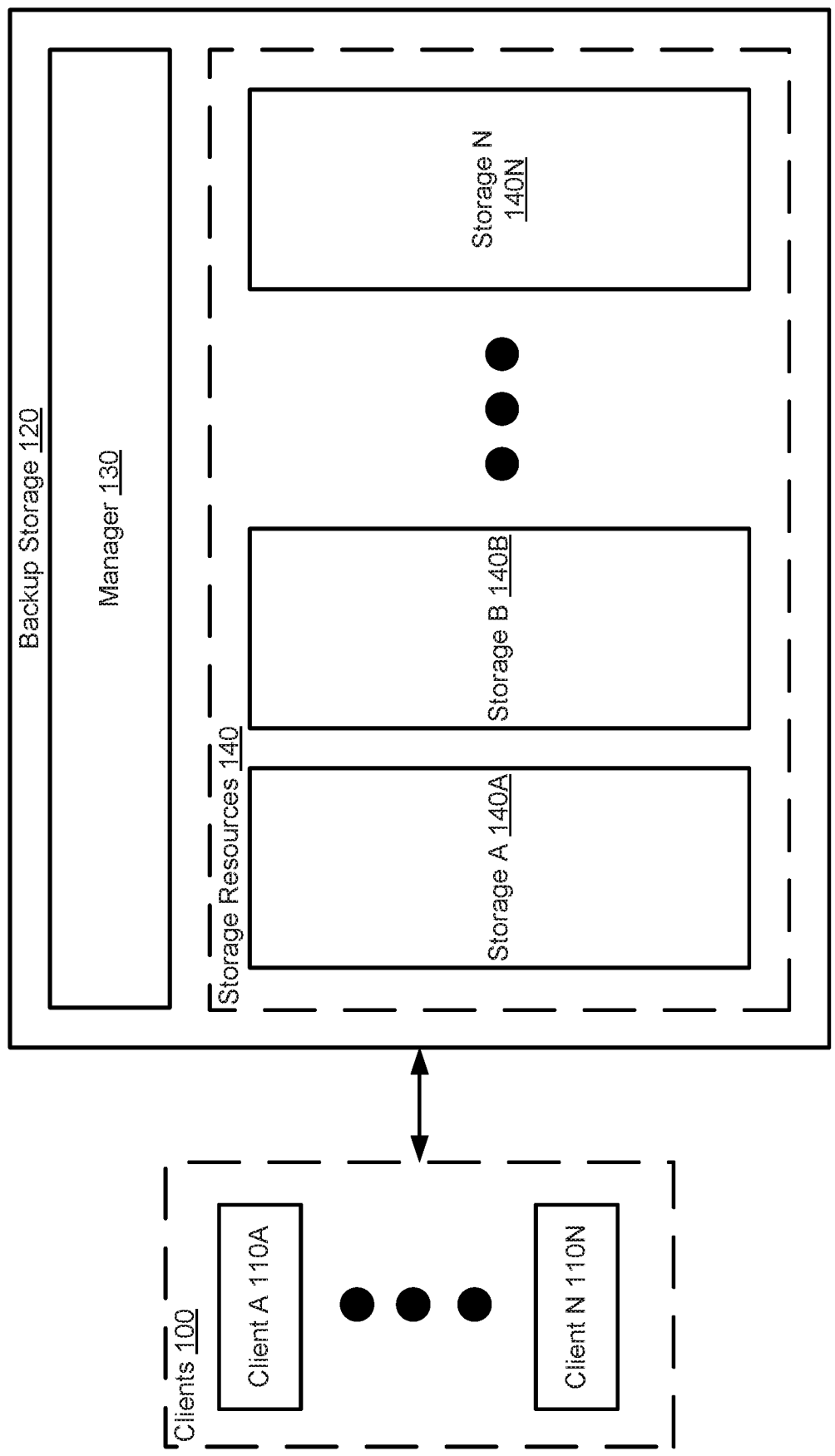
FIG. 1 shows a diagram of a system in time in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

In general, embodiments of the invention relate to systems, devices, and methods for reducing the impact of temporary unavailability of storages in a backup storage system. Specifically, a system in accordance with embodiments of the invention may monitor availability of storages and determine storages that are available in which to store backups. By doing so, the impact of temporary unavailability of storages on backup storage systems may be reduced.

A system in accordance with embodiments of the invention may manage the storage of backups in a backup storage system that may have temporarily unavailable storages in a manner that is computationally efficient. To manage the storage of backups, the system may store different types of backups depending on the availability storages. The first type of backup, which may rely on a previous backup stored in a first storage that is available for restoration purposes, may be stored on the first storage. When the first storage becomes temporarily unavailable, a second type of backup may be stored in a second storage that is available that requires a previous backup stored in the temporarily unavailable first storage for restoration purposes. The second type of backup may be chained to the previous backup stored in the temporarily unavailable storage. The second type of backup may be converted to the first type of backup when the first storage becomes available again in a computationally efficient manner.

FIG. 1 shows a system in accordance with one or more embodiments of the invention. The system may include clients (100) that obtain data backup storage services from a backup storage (120). The data backup storage services may include storing client data in a storage (e.g., 140A) of storage resources (140) of the backup storage (120).

The backup storage (120) may include a manager (130) and storage resources (140). The storage resources (140) may include multiple storages (e.g., 140A, 140B, 140N). The client data may be stored in the backup storage (120), for example, for data protection purposes. The data may be stored for other purposes without departing from the invention. The manager (130) may provide the data backup storage services to the clients (100).

The client data may be stored in the backup storage (120). The backup storage (120) may include storages (140) that may become temporarily unavailable. At any point in time, any number of the storages (e.g., 140A, 140B, 140N) of the backup storage (120) may be available (i.e., accessible) or unavailable (i.e., inaccessible). The backup storage may include any number of storages.

The unavailability of a storage of the storages (e.g., 140A) may be temporary. A storage (e.g., 140A) of the storages (140) may be unavailable, for example, due to scheduled or unscheduled maintenance. The unavailable storage (e.g., 140A) may become available at some point in time after the storage (e.g., 140A) became unavailable. The storage (e.g., 140A) may become unavailable for other purposes without departing from the invention.

To manage the storage of data in the storages (140), the manager may determine where to store backups, determine the types of backups, and merge backups. For example, if a first storage (e.g., 140A) is available and the previous stored backup is on the first storage (e.g., 140A), the manager (130) may merge an incremental backup from a client (e.g., 110A) with the previous backup to generate a synthetic backup and store that backup in the first storage (e.g., 140A). If the first storage (e.g., 140A) is unavailable, the manager (130) may select a second available storage (e.g., 140B) and store a chain-based backup on the available storage (e.g., 140B). Once the chain-based backup is stored in the second available storage (e.g., 140B), a merge request may be added to a queue of pending merge requests that may be maintained by the manager (130). When the first storage (e.g., 140A) becomes available again, the manager (130) may merge the chain-based backup on the second storage (e.g., 140B) with the previous synthetic or full backup on the first storage (e.g., 140A) to generate and store a synthetic backup in the second storage (e.g., 140B).

Each of the components of the system may be operably connected to each other and/or other entities not shown using any combination and quantity of wired and/or wireless networks. Each component of the system is discussed below.

The clients (100) may be implemented using computing devices. The computing devices may be, for example, mobile phones, tablet computers, laptop computers, desktop computers, servers, or cloud resources. The computing devices may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform all, or a portion, of the functions described in this application and/or all, or a portion, of the methods illustrated in FIGS. 4A-4D. The clients (100) may be implemented using other types of computing devices without departing from the invention. For additional details regarding computing devices, refer to FIG. 6.

The clients (100) may be implemented using logical devices without departing from the invention. For example, the clients (100) may be virtual machines that utilize computing resources of any number of physical computing devices to provide the functionality of the clients (100). The clients (100) may be implemented using other types of logical devices without departing from the invention.

A system in accordance with one or more embodiments of the invention may include any number of clients (e.g., 110A, 110N) without departing from the invention. For example, a system may include a single client (e.g., 110) or multiple clients (e.g., 110A, 110N).

In one or more embodiments of the invention, the clients (100) utilize data backup storage services provided by the backup storage (120). Utilizing data backup storage services may include (i) storing data in the backup storage (120), and (ii) obtaining stored data from the backup storage (120) . . . . . To utilize the data backup storage services, the clients (100) may perform actions under the directions of the manager (130) of the backup storage (120). By doing so, the manager (130) may orchestrate the generation and storage of backups of the clients (100) in the storages (140) of the backup system (120). For example, a client may request that backups of the client be stored in the backup storage (120). The client may send a backup to the manager (130) in order to store a backup in one or more of the storages (140) of the backup system (120). The clients (100) may utilize and/or provide other and/or additional services without departing from the invention.

In one or more embodiments of the invention, the backup storage (120) provides data backup storage services to the clients (100). The data backup storage services may include (i) obtaining incremental backups from the clients (100), (ii) merging the incremental backups from the clients (100) with previous stored full or synthetic backups to store a synthetic backups in a first available storage (e.g., 140A), (iii) storing chain-based backups when the first storage (e.g., 140A) is unavailable in a second available storage (e.g., 140B) by chaining an incremental backups from clients (100) with previous stored backups on the first storage (e.g., 140A) using metadata (212, FIG. 2), (iv) maintaining a queue of pending merge requests to merge the chain-based backups with previous backups on the first storage (e.g., 140A) when the first storage (e.g., 140A) becomes available again, and (v) merging the chain-based backups on the second storage (e.g., 140B) with the previous backups on the first storage (e.g., 140A) when the first storage (e.g., 140A) becomes available again to store synthetic backups in the second storage (e.g., 140B). The backup storage (120) may provide other and/or additional services without departing from the invention.

The backup storage (120) may include components that perform all, or a portion of, the services discussed above. The backup storage (120) may include a manager (130) and storage resources (140). The storage resources (140) may include multiple storages (e.g., 140A, 140B, 140N). The backup storage (120) may include other and/or additional components not shown in FIG. 1 without departing from the invention. Each of the components shown in FIG. 1 of the backup storage (120) are discussed below.

The manager (130) may be implemented as a computing device. The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the manager (120) described throughout this application and/or all, or a portion thereof, of the methods illustrated in FIGS. 4A-4D. The manager (130) may be another type of computing device without departing from the invention. For additional details regarding computing devices, refer to FIG. 6.

The manager (130) may be implemented as a logical device. The logical device may utilize the computing resources of any number of computing devices and thereby provide the functionality of the manager (130) described throughout this application and/or all, or a portion thereof, of the methods illustrated in FIGS. 4A-4D. The manager (130) may be implemented as another other type of logical device without departing from the invention.

In one or more embodiments of the invention, the manager (130) provides data backup storage services to the clients (100). The data backup storage services may include orchestrating the storage of client data in storages (140). To orchestrate the storage of data, the manager (130) may (i) determine where to store a backup in the storage resources (140), (ii) determine the type of backup to be stored, (iii) maintain a queue of pending merge requests, and (iv) merge backups. The manager (130) may provide other and/or additional services for the clients (100) and/or backup storage (120) without departing from the invention. For additional details regarding the manager (130), refer to FIG. 2.

In one or more embodiments of the invention, the storage resources (140) is implemented using storage devices. The storage devices may be implemented using physical storage devices and/or logical storage devices. The storage resources (140) may be implemented using other types of devices that provide data storage services without departing from the invention.

A logical storage device may be an entity that utilizes the physical storage devices of one or more computing devices to provide data storage services. For example, a logical storage may be a virtualized storage that utilizes any quantity of storage resources (e.g., physical storage devices) of any number of computing devices.

A physical storage device may be a physical device that provides data storage services. For example, a physical storage device may include any number of physical devices such as, for example, hard disk drives, solid state drives, tape drives, and/or other types of hardware devices that store data. The physical storage device may include any number of other types of hardware devices for providing data storage services. For example, the physical storage device may include storage controllers that balance and/or allocate storage resources of hardware devices, load balancers that distribute storage workloads across any number of hardware devices, memory for providing cache services for the hardware devices, etc.

In one or more embodiments of the invention, the storages (140) provide data storage services to the clients (100). The data storage services may include storing data provided by the clients (100) and the manager (130) and providing of previously stored data to clients (100) and the manager (130). Such stored data may be backups used for restoration (and/or other) purposes by the clients (100) and the manager (130). The backups stored on the storages (e.g., 140A) may be different types of backups. These types of backups may include full backups, synthetic backups, and chain-based backups. For additional information regarding the different types of backups, refer to FIG. 3D. The storages (140) may provide other and/or additional services without departing from the invention. For additional information regarding the storages (140), refer to FIGS. 3A-3C.

While the system of FIG. 1 has been described and illustrated as including a limited number of components for the sake of brevity, a system in accordance with embodiments of the invention may include additional, fewer, and/or different components than those illustrated in FIG. 1 without departing from the invention.

Figure 2:
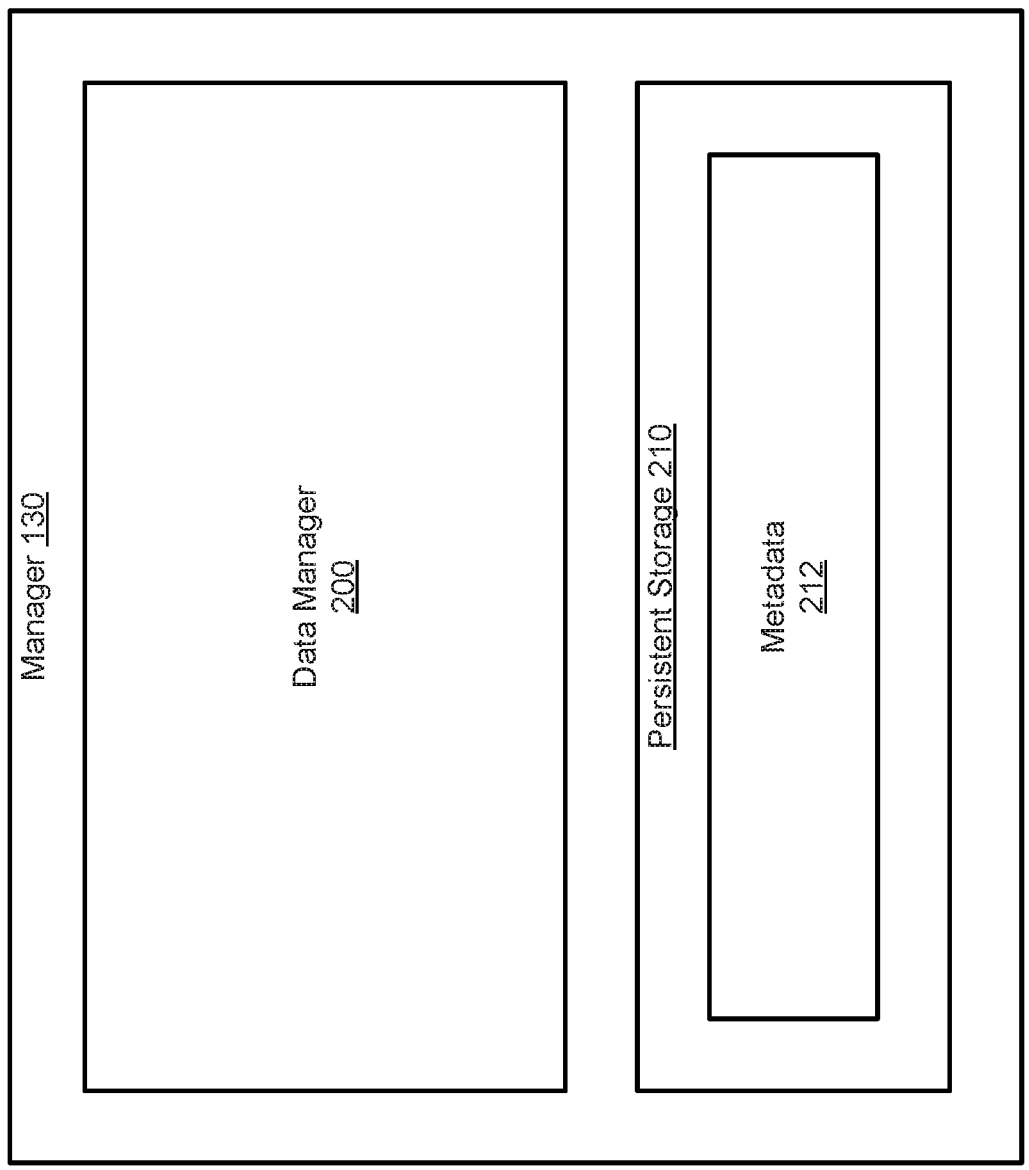
FIG. 2 shows a diagram of a manager in accordance with one or more embodiments of the invention.

As discussed above, a system in accordance with embodiments of the invention may include a manager. FIG. 2 shows a diagram of the manager (130) of FIG. 1 in accordance with one or more embodiments of the invention. As discussed above, the manger (130) may orchestrate the storage of client data in storages (140) of the backup storage (120). To provide the aforementioned functionality, the manager (130) may include a data manager (200) and persistent storage (210). The persistent storage (210) may store data structures utilized by the data manager (210). Each component of the manager (130) is discussed below.

In one or more embodiments of the invention, the data manager (200) is implemented using a physical device. The physical device may include circuitry. The physical device may be, for example, a field-programmable gate array, application specific integrated circuit, programmable processor, microcontroller, digital signal processor, or other hardware processor. The physical device may be adapted to provide the functionality of the data manager (200) described throughout this application and/or all or a portion of the methods illustrated in FIGS. 4A-4D. The data manager (200) may be implemented using another type of physical device without departing from the invention.

The data manager (200) may be implemented using computer instructions (e.g. computer code) stored on a persistent storage that when executed by a processor of the manager (130) cause the manager (130) to provide the functionality of the data manager (200) described throughout this application and/or all or a portion of the methods illustrated in FIGS. 4A-4D.

The data manager (200) may provide data storage management services to the manager (130) and clients (100). The data storage management services may include (i) monitoring storage availability, (ii) determining the type of backups to generate based on the availability, and (iii) managing storage of the backups by storing and merging backups based on storage availability.

The data manager (200) may determine if a storage (e.g., 140A, FIG. 1) of the storages (140, FIG. 1) is available. To determine if a storage (e.g., 140A, FIG. 1) is available, the data manager (200) may send a backup storage request to a storage (e.g., 140A, FIG. 1). The storage (e.g., 140A, FIG. 1) may send back a storage available message or a storage (e.g., 140A, FIG. 1) unavailable message. Based on the return message from the storage (e.g., 140A, FIG. 1), the data manager (200) may determine if the storage (e.g., 140A, FIG. 1) is available. The data manager (200) may determine if a storage (e.g., 140A, FIG. 1) is available in another manner without departing from the invention.

The data manger (200) may determine the storage (e.g., 140A, FIG. 1) of storages (140, FIG. 1) in which to store a backup. The data manager (200) may utilize the determination of storage (e.g., 140A, FIG. 1) availability to determine if the storage (e.g., 140A, FIG. 1) should be used to store the backup. For example, the data manager (200) may determine that a storage (e.g., 140A, FIG. 1) is available. Based on that determination, the data manager (200) may store a backup into that storage (140A, FIG. 1). However, the data manager (200) may determine that the storage (140A, FIG. 1) is unavailable. The data manager (200) may not store a backup into that storage (140A, FIG. 1) and check the availability of another storage (e.g., 140B, FIG. 1). The data manager (200) may continue this process until an available storage is found and the data manager (200) may determine to store a backup in the available storage.

The data manager (200) may merge various types of backups. The data manager (200) may merge together two different backups to generate a single backup. The data manager may maintain a queue of pending merge requests if there are multiple sets of backups that are to be merged. The merge requests may be generated and put in the queue by the data manager (200) after a chain based backup (e.g., 310, FIG. 3B) is stored on a storage (e.g., 140B, FIG. 3B). The generated backup may be the same type of backup as one of the two backups that were used to generate the generated backup. The generated backup may be a different type of backup than the two backups that were used to generate it. For additional information regarding the types of backups the data manager may merge, refer to FIG. 3D.

The data manager (200) may utilize data structures stored in a persistent storage (210) of the manager (130). The persistent storage (210) may be implemented using physical storage devices and/or logical storage devices.

The persistent storage (210) may be implemented using a physical storage. The physical storage may include any combination of hard disk drives, solid state disk drives, tape drives, and/or any other physical storage mediums for the storage of data. The persistent storage (210) may be another type of physical storage without departing from the invention.

The persistent storage (210) may be implemented using a logical storage (e.g., virtualized storage) that utilizes any quantity of hardware storage resources of any number of computing devices for storing data. For example, the persistent storage (210) may utilize portions of any combination of hard disk drives, solid state disk drives, tape drives, and/or any other physical storage medium of any number of computing devices. The persistent storage (210) may be another type of storage without departing from the invention.

In one or more embodiments of the invention, the persistent storage (210) stores metadata (212). The metadata (212) may include information regarding previous backups in the backup storage (120). This information may include backup locations, backup sizes, backup types, and backup timestamps. The metadata (212) may also include storage availability information. For example, the metadata (212) may include a log that includes timestamps of when storages (e.g., 140A, 140B, 140N, FIG. 1) of the storage resources (140, FIG. 1) become available and/or unavailable and also the current availability status of all the storages (e.g., 140A, 140B, 140N, FIG. 1) of the storage resources (140, FIG. 1). The metadata (212) may include other and/or additional information regarding previous backups in the backup storage and storage availability. The persistent storage (210) may store other and/or additional data structures without departing from the invention.

While the manager (130) of FIG. 2 has been described and illustrated as including a limited number of components for the sake of brevity, a manager (130) in accordance with embodiments of the invention may include additional, fewer, and/or different components than those illustrated in FIG. 2 without departing from the invention.

Figure 3A:
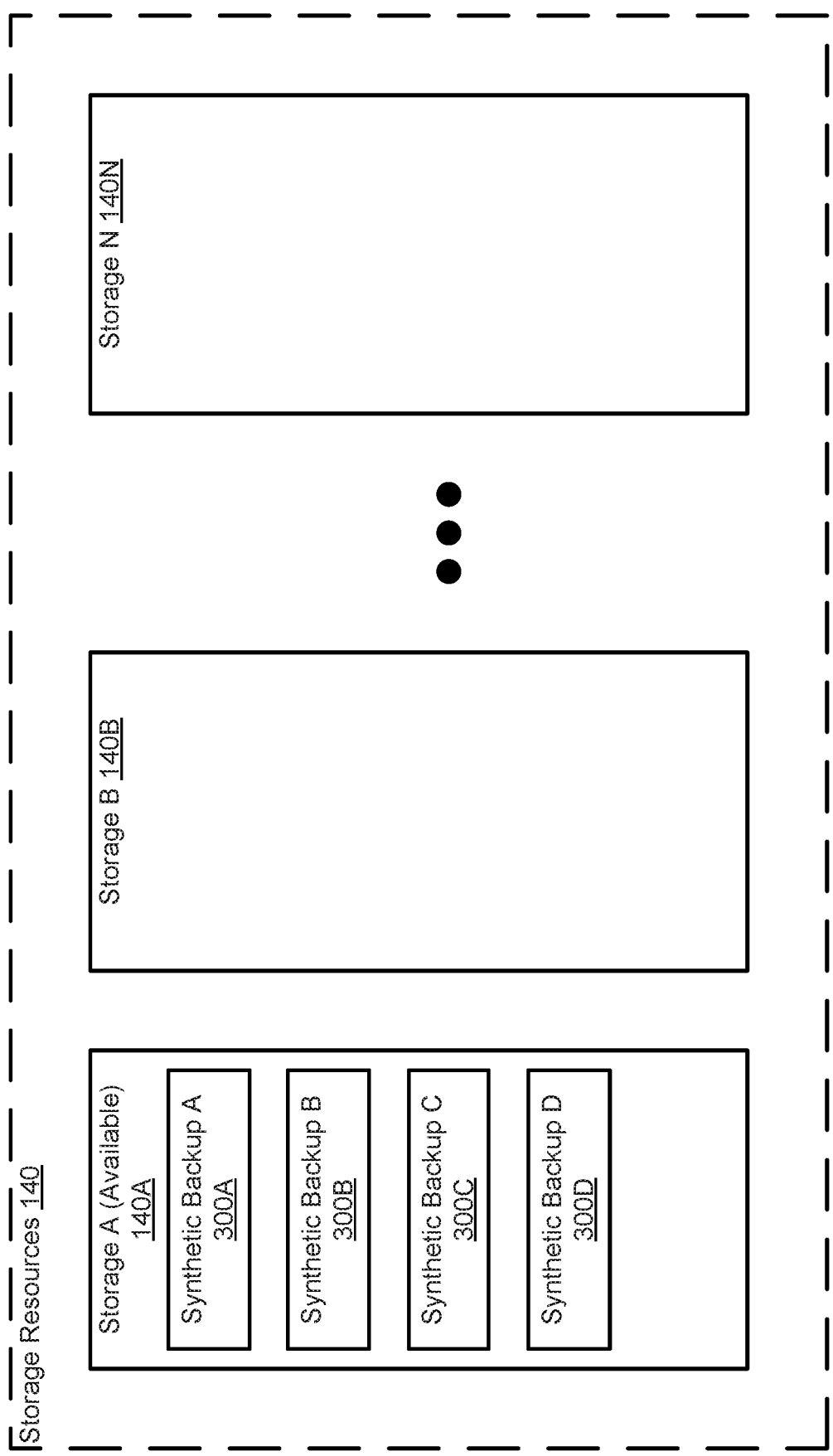
FIG. 3A shows a diagram of storage resources at a first point in time in accordance with one or more embodiments of the invention.

As discussed above, the storage resources (140) may be storage devices that may store backups from the clients (100). FIG. 3A shows a diagram of the storage resources (140) at some point in time in accordance with one or more embodiments of the invention. The storage resources (140) may be similar to the storage resources (140) of FIG. 1. As discussed above, the storage resources (140) may provide data storage services for the clients (100, FIG. 1). The storage resources (140) may include multiple storages (140A, 140B, 140N).

At the aforementioned point in time, storage A (140A) may be available. Storage A (140A) may have been available prior to the point in time leading up to that point in time. Storage A (140A) may have been selected by the data manager (200, FIG. 2) to store backups for the clients (100) prior to the point in time. Multiple backups (300A, 300B, 300C, and 300D) may have been stored in storage A (140A) during that time. The backups (300A, 300B, 300C, and 300D) may be synthetic backups (300). For additional information regarding to synthetic backups, refer to FIG. 3D.

Another storage (e.g., 140B or 140N) may have been selected to store the backups (300A, 300B, 300C, and 300D) without departing from the invention. There may be any number of backups stored on storage A (140A) without departing from the invention. There may be existing backups on the storages that were not selected (140B and/or 140N) without departing from the invention. The storages that were not selected (140B and 140N) may be available or unavailable without departing from the invention.

Figure 3B:
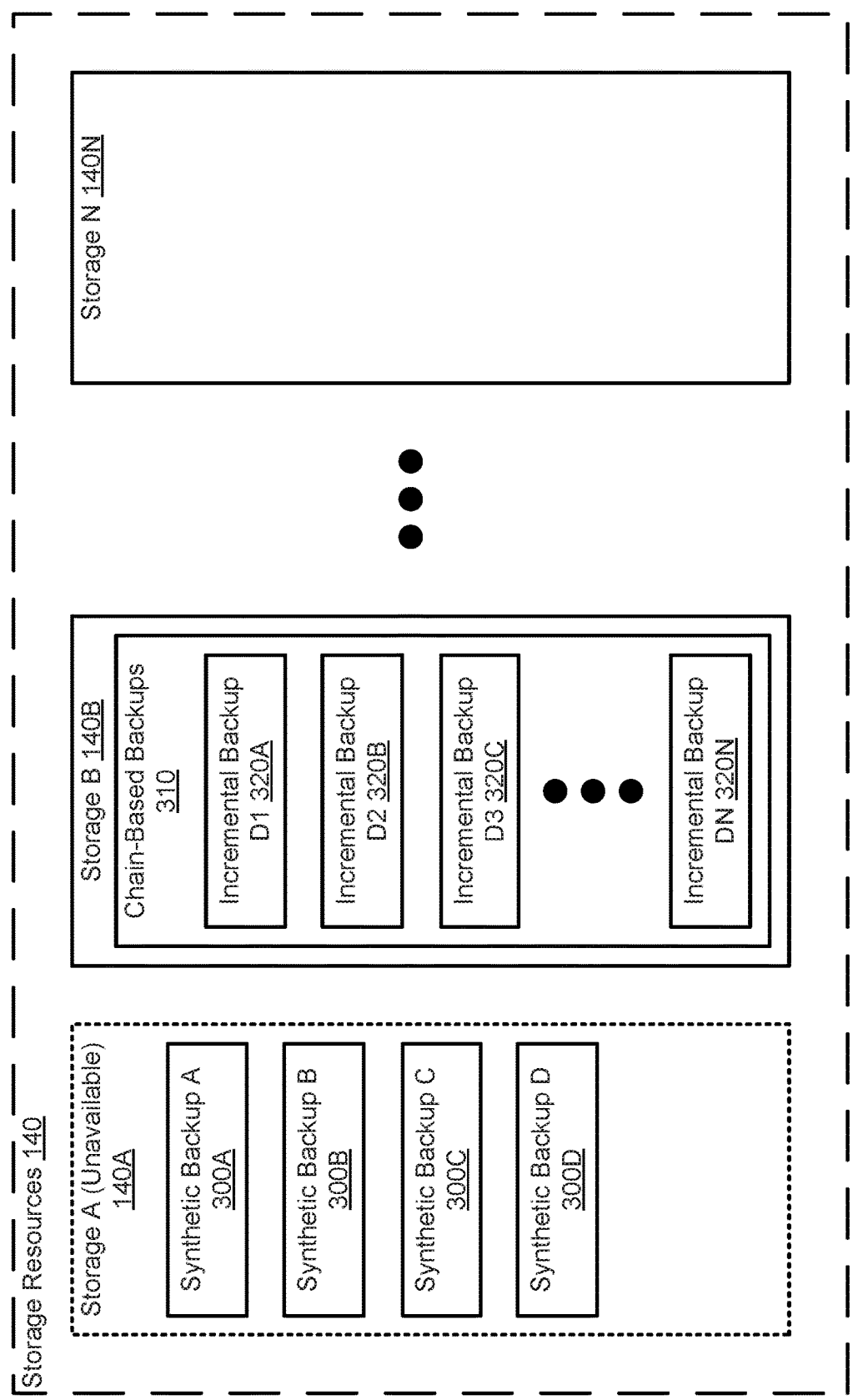
FIG. 3B shows a diagram of storage resources at a second point in time in accordance with one or more embodiments of the invention.

FIG. 3B shows the storage resources (140) in accordance with one or more embodiments of the invention at a second point in time after the point in time illustrated in FIG. 3A. At the second point in time, storage A (140A) may be unavailable, depicted by the dashing in FIG. 3B. As a result of the unavailability of storage A (140A), the contents of storage A (140A) may be unavailable and backups may not be able to be stored on storage A (140A). As discussed above, there may be multiple backups (300A, 300B, 300C, and 300D) stored in storage A (140A). Storage A (140A) may be expected to become available again at a future point in time. That future point in time may be any time after storage A (140A) became unavailable. Storage A (140A) may be unavailable, for example, for maintenance purposes. Storage A (140A) may be temporarily unavailable for other and/or additional reasons without departing from the invention.

While storage A (140A) may be unavailable, the contents (e.g., 300A, 300B, 300C, and 300D) of storage A (140A) may also be unavailable. In other words, no other component in the backup storage (120, FIG. 1) may be able to access and/or utilize the contents (300A, 300B, 300C, and 300D) of storage A (140A) while storage A (140A) may be unavailable. Consequently, it may not be possible to store backups in storage A (140) while storage A is unavailable.

Storage B (140B) may have been available after the second point in time after which storage A (140A) became unavailable. Consequently, the data manager (130) may have stored backups (e.g., 320A, 320B, 320C, and 320N) in storage B (140B). These backups may be chain-based backups (310). The chain-based backups (310) may include incremental backups (320A, 320B, 320C, and 320N). Each of the included incremental backups may be chained to the previous synthetic and/or incremental backups. In other words, the incremental backups (e.g., 320A, 320B, 320C, and 320N) of the chain-based backups (e.g., 310) are dependent on the previous backup(s) for restoration purposes.

For example, incremental backup D1 (320A) may chained to synthetic backup D (300D) and may need synthetic backup D (300D) to complete a restoration. Incremental backup D2 (320B) may be chained to incremental backup D1 (320A) and synthetic backup D (300D) and may need both incremental backup D1 (320A) and synthetic backup D (300D) to complete a restoration. Incremental backup D3 (320C) may be chained to incremental backup D2 (320B), incremental backup D1 (320A), and synthetic backup D (300D) and need incremental backup D2 (320B), incremental backup D1 (320A), and synthetic backup D (300D) to complete restoration. For additional information regarding synthetic backups (300A, 300B, 300C, and 300D), chain-based backups (310), and incremental backups (320A, 320B, 320C, and 320N), refer to FIG. 3D.

There may be any number of chain-based backups (310) and incremental backups (320) stored in storage B (140B) without departing from the invention. Storage B (140B) may have existing backups stored prior to the second point in time when storage A (140A) became unavailable without departing from the invention. The data manager (200) may have selected another available storage (e.g., 140N) besides storage B (140B) to store the chain-based backups (310) without departing from the invention.

Figure 3C:
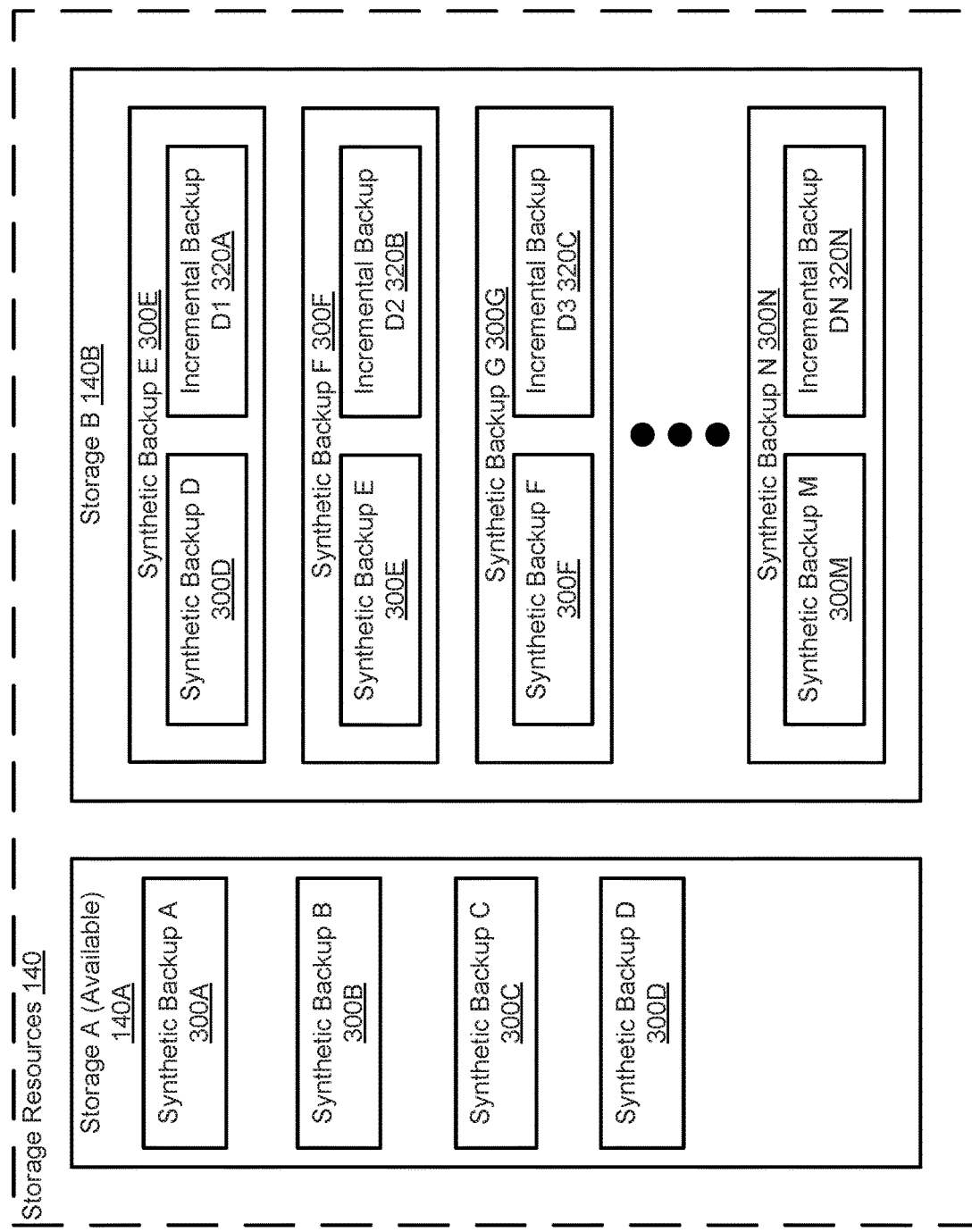
FIG. 3C shows a diagram of storage resources at a third point in time in accordance with one or more embodiments of the invention.

FIG. 3C shows the storage resources (140) in accordance with one or more embodiments of the invention at a third point in time, after the second point in time. In the time between the second point in time shown in FIG. 3B and the third point in time shown in FIG. 3C, storage A (140A) may have become available again. During that period of time, the chain based backups (310, FIG. 3B) and the incremental backups (320A, 320B, 320C, and 320N) that were previously in storage B, may have been converted to synthetic backups (300E, 300F, 300G, and 300N) by merging the chain based backup (310) with the now available previous synthetic backup (300D) in storage A (140A) and the subsequently created synthetic backups (300E, 300F, 300M) in storage B (140B). For additional information regarding synthetic backups (300), chain-based backups (310), and incremental backups (320), refer to FIG. 3D.

Storage B (140B) may include existing backups prior to the time period between FIGS. 3B-3C without departing from the invention. The amount of synthetic backups (300) generated in the time period between FIGS. 3B-3C may depend on the amount of chained based backups (310) stored in storage B (140B) at the instant storage A (140A) became available, assuming no other storage (e.g., 140N) may have been used to store the chain-based backups (310).

FIGS. 3A-3B show that there may be no backups stored in storage N (140N) during the period of time leading up to the point in time depicted in FIG. 3C. When merging the chain-based backups (310) on storage B (140B) with a synthetic backup (300D) on storage A (140A) as depicted in FIG. 3C, only storage A (140A) and storage B (140) may be utilized, while storage N (140N) may not be utilized in the merging of chain-based backups (310) of storage B (140B) with synthetic backups (e.g., 300D) on storage A (140A). Because storage N (140N) may not be utilized in the merging of chain-backups (310) with synthetic backups (300D) shown in FIG. 3C, storage N (140N) is not shown in FIG. 3C.

While the storage resources (140) of FIGS. 3A-3C have been described and illustrated as including a limited number of components for the sake of brevity, storage resources (140) in accordance with embodiments of the invention may include additional, fewer, and/or different components than those illustrated in FIGS. 3A-3C without departing from the invention.

Figure 3D:
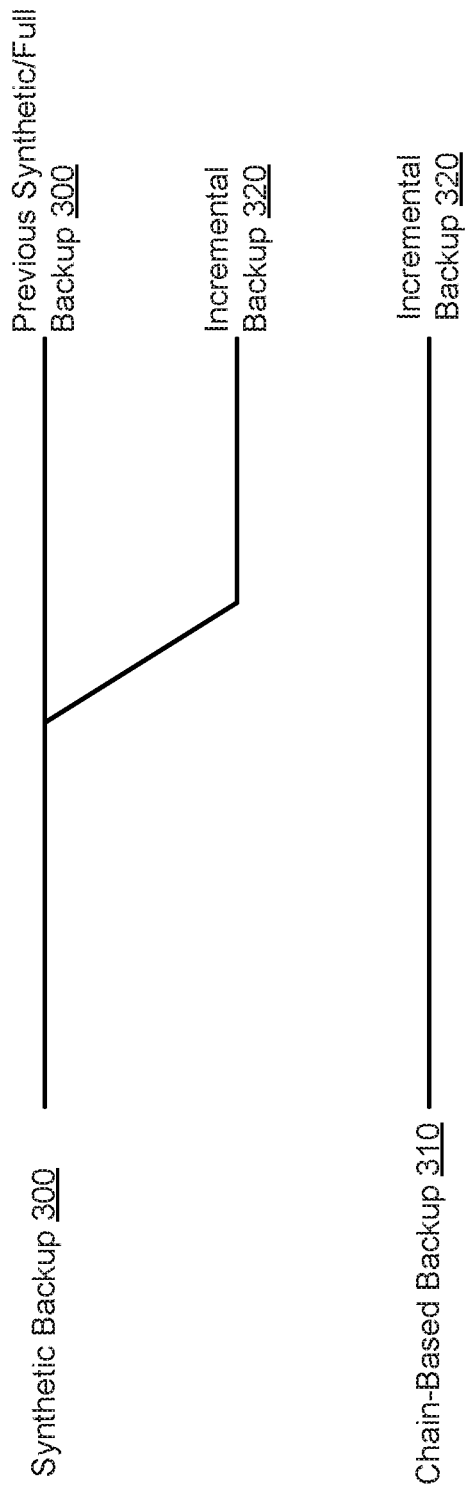
FIG. 3D shows a diagram of backups in accordance with one or more embodiments of the invention.

As previously discussed, there may be several different types of backups stored in the storage resources (140). The types of backups may be full backups, synthetic backups (300), chain-based backups (310), and incremental backups (320). FIG. 3D shows a relationship diagram that illustrates relationships between the different types of backups in accordance with one or more embodiments of the invention. Each of these types of backups is discussed below.

A full backup may be a backup of client data that includes sufficient data required to independently recover the client (i.e., no other backups are required) to a predetermined point in time. The full backup may include a timestamp that specifies the predetermined point in time. To recover the client data to the point in time specified by the full backup, the data manager (200, FIG. 2) obtains the full backup and may not need any additional backups. For example, the full backup may be an image of the data of a backed up entity at a particular point in time. The image may be used to restore the state of the entity to the particular point in time.

An incremental backup (320) may be a backup of client data that includes changes to the client data over a period of time. The chain based backup may be used in combination with other types of backups to restore the state of a backed up entity. An incremental backup (320) may be, for example, a log of transactions (e.g., data written to the client) that occur over a period of time. The period of time may be from when another backup (which may be any type of backup) was generated.

A synthetic backup (300) may be a backup that is generated after merging either a full backup or another synthetic backup (300) with an incremental backup (320) (e.g., to reflect the state of an entity at a predetermined point in time after points in time associated with full or synthetic backups). Additionally, multiple chain based backups may be used in combination with a full or another synthetic backup. For example, the synthetic backup (e.g., 300A, FIG. 3A) or full backup may be used to generate a synthetic backup (e.g., 300B, FIG. 3A) associated with another point in time.

A synthetic backup (300) may act as a full backup for restoration purposes. A synthetic backup (e.g., 300E, FIG. 3A) may contain all the client data included in the previous full or synthetic backup (300D) modified by the changes specified by a chain based backup. Synthetic backups (300) may improve the resiliency and usability of the data.

A chain-based backup (310) may be an incremental backup (320) chained to a previous synthetic or full backup (300) using the backup metadata (212). In other words, dependent on another backup for restoration purposes.

A chain-based backup (310) may be generated when the previous backup is stored in a storage (e.g., 140A, FIG. 3B) that is unavailable and the previous backup (e.g., 300D, FIG. 3B) cannot be accessed to merge with an incremental backup (e.g., 320A, FIG. 3B) to generate a synthetic backup (300). The metadata (232) used to chain an incremental backup (320) with an unavailable synthetic or full backup (300) may include data regarding the unavailable synthetic or full backup (300) storage location, timestamp, and/or size. The metadata (320) may include other and/or additional data regarding the previous synthetic or full backup (300) without departing from the invention.

Chain-based backups (310) may be converted to synthetic backups (300) when the storage (e.g., 140A, FIG. 3C) containing the previous backup that the incremental backup is chained to becomes available by merging the incremental backup and the previous synthetic or full backup to which the incremental backup is chained.

As discussed above, a backup storage in accordance with embodiments of the invention may store backups and merge backups to provide data backup storage services. FIGS. 4A-4D show methods that may be performed by a backup storage when providing data backup storage services.

Figure 4A:
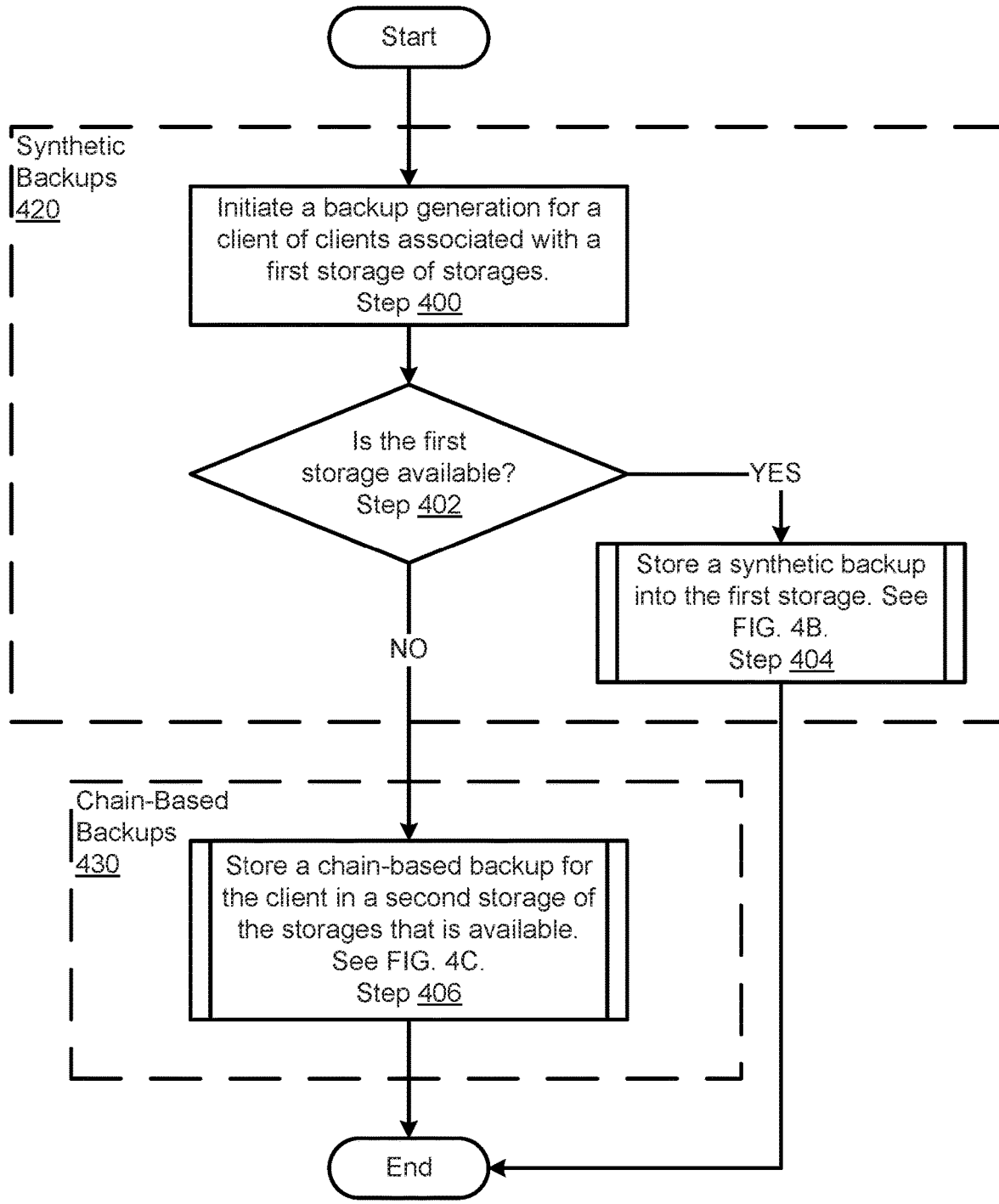
FIG. 4A shows a flowchart of a method of managing a backup storage system with temporarily unavailable storages in accordance with one or more embodiments of the invention.

FIG. 4A shows a flowchart of a method in accordance with one or more embodiments of the invention. The method depicted in FIG. 4A may be used to provide data backup storage services for the clients (100) in accordance with one or more embodiments of the invention. The method shown in FIG. 4A may be performed by, for example, the manager (e.g., 130, FIG. 1). Other components of the system in FIG. 1 may perform all, or a portion, of the method of FIG. 4A without departing from the invention.

While FIG. 4A is illustrated as a series of steps, any of the steps may be omitted, performed in a different order, additional steps may be included, and/or any or all of the steps may be performed in a parallel and/or partially overlapping manner without departing from the invention.

In step 400, a backup generation for a client of clients associated with a first storage of storages is initiated.

The backup generation may be initiated by the data manager of the backup storage. The data manager may send a message to an agent hosted by the client to initiate the backup generation. As part of the request, the data manager may specify for which entities of the client will be included in the backup generation. The agent then generates a backup of the client and sends the generated backup to the backup storage. Backup generation for a client of clients associated with a first storage of storages may be initiated via other/and or additional methods without departing from the invention.

In step 402, it is determined whether the first storage of storages is available.

The determination may be made by the manager when attempting to access the storage. The manager may attempt to access storage space to write the initiated backup into storage or attempt to access an existing backup in the storage. But when doing this, the manager may receive a flag that the storage is unavailable. In contrast, the manager may be able to access the storage or previous backup, and the storage may be determined to be available. The availability of the storage may be determined via other and/or additional methods without departing from the invention.

If the storage is determined to be available, the method may proceed to step 404. If the storage is determined to be unavailable, the method may proceed to step 406.

In step 404, a synthetic backup is stored in the first storage.

In one or more embodiments of the invention, the synthetic backup is stored by the data manger by merging an incremental backup of the client with a previously stored synthetic or full backup. The synthetic backup may be stored in the first storage via the method illustrated in FIG. 4B. The synthetic backup may be stored in the first storage via other methods without departing from the invention.

The first storage may be any of the multiple storages in the backup storage that the manager selected to store the backup.

The method may end following step 404.

Returning to step 404, the method may proceed to step 406 following step 404 if the first storage is unavailable.

In step 406, a chain-based backup is stored in a second available storage of the storages for the client.

In one or more embodiments of the invention, after determining the first storage is unavailable, the data manager selects another storage that is available. The data manager may go through and check the availability of any number of storages to select another storage without departing from the invention. The chain-based backup may be stored in the second storage via the method illustrated in FIG. 4C. The chain-based backup may be stored in the second storage via other methods without departing from the invention.

The method may end following step 406.

There may be two different portions of the method depicted in the flowchart of FIG. 4A. There may be a synthetic backups (420) portion and a chain-based backups (430) portion. The synthetic backups (420) portion may include steps 400, 402, and 404 of the method shown in FIG. 4A. The synthetic backups portion may result in the generation of synthetic backups. The synthetic backups process may be performed any number of times without departing from the invention as long as the first storage is available. The synthetic backup process may include different, additional, and/or fewer steps than as illustrated in FIG. 4A without departing from the invention.

The chain-based backups portion may include step 406 of the method shown in FIG. 4A. The chain-based backups portion may be performed any number of times without departing from the invention while the first storage is unavailable. The chain-based backups portion may include different, additional, and/or fewer steps than as illustrated in FIG. 4A without departing from the invention.

Figure 4B:
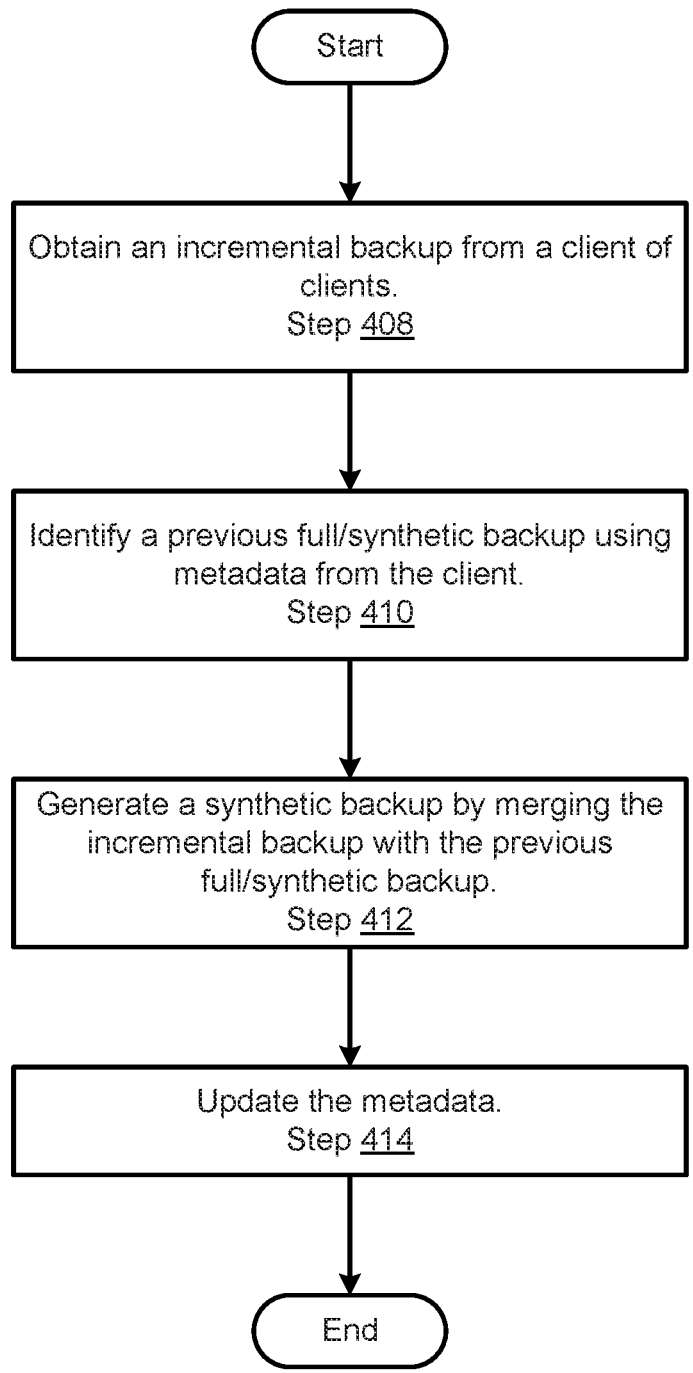
FIG. 4B shows a flowchart of a method of storing a synthetic backup in accordance with one or more embodiments of the invention.

As discussed above, a synthetic backup may be stored in a first storage using the method illustrated in FIG. 4A. FIG. 4B shows a flowchart of a method in accordance with one or more embodiments of the invention. The method depicted in FIG. 4B may be used to store a synthetic backup in accordance with one or more embodiments of the invention. The method shown in FIG. 4B may be performed by, for example, a manager (e.g., 130, FIG. 1). Other components of the system illustrated in FIG. 1 may perform all, or a portion, of the method of FIG. 4B without departing from the invention.

While FIG. 4B is illustrated as a series of steps, any of the steps may be omitted, performed in a different order, additional steps may be included, and/or any or all of the steps may be performed in a parallel and/or partially overlapping manner without departing from the invention.

In step 408, an incremental backup is obtained from a client of the clients.

In one or more embodiments of the invention, the manager of the backup storage sends a request to an agent hosted by the client. The agent may generate the incremental backup requested by the manager of the backup storage. After generating the incremental backup, the agent may send the incremental backup to the manager of the backup storage. The incremental backup may be obtained from a client of clients via other and/or additional methods without departing from the invention.

In step 410, a previous synthetic or full backup is identified using metadata from the client.

In one or more embodiments of the invention, the manager uses backup metadata to identify the previous backup stored in the storage. The previous backup may be a synthetic backup or a full backup without departing from the invention. The metadata may specify the previous backup's location, timestamp and/or other or additional information regarding the previous backup without departing from the invention. The manager may utilize the information from the metadata to identify the previous backup, and may request the previous backup from the storage. The previous backup (e.g., a synthetic or a full backup) may be identified via other and/or additional methods without departing from the invention.

In step 412, a synthetic backup is generated by merging the incremental backup with the previous synthetic or full backup.

As noted above, an incremental backup may be a backup of client data that includes changes to the client data since a last backup of the client data was generated and stored. The manager may then obtain the previous backup (a synthetic or a full backup) from the storage resources that was previously identified. By merging the incremental backup with the previous synthetic or full backups, the manager may generate a synthetic backup. To merge the incremental backup, changes specified by the incremental backup may be applied to the previous backup. The manager may merge an incremental backup with a previous backup via other methods without departing from the invention. A synthetic backup may be generated via methods without departing from the invention.

In step 414, the metadata is updated to include information regarding the newly generated and stored synthetic backup from the merging of the incremental backup with the previous backup.

In one or more embodiments of the invention, the metadata is updated to include information regarding the newly generated synthetic backup. The manager may write the information pertaining to the generated synthetic backup to the metadata stored in the persistent storage of the manager. The metadata may include the location, timestamp, backup type, and/or backup size of the newly generated synthetic backup. The metadata may include other information regarding the newly generated synthetic backup without departing from the invention. The metadata may be updated via other and/or additional method without departing from the invention.

The method may end following step 414.

Figure 4C:
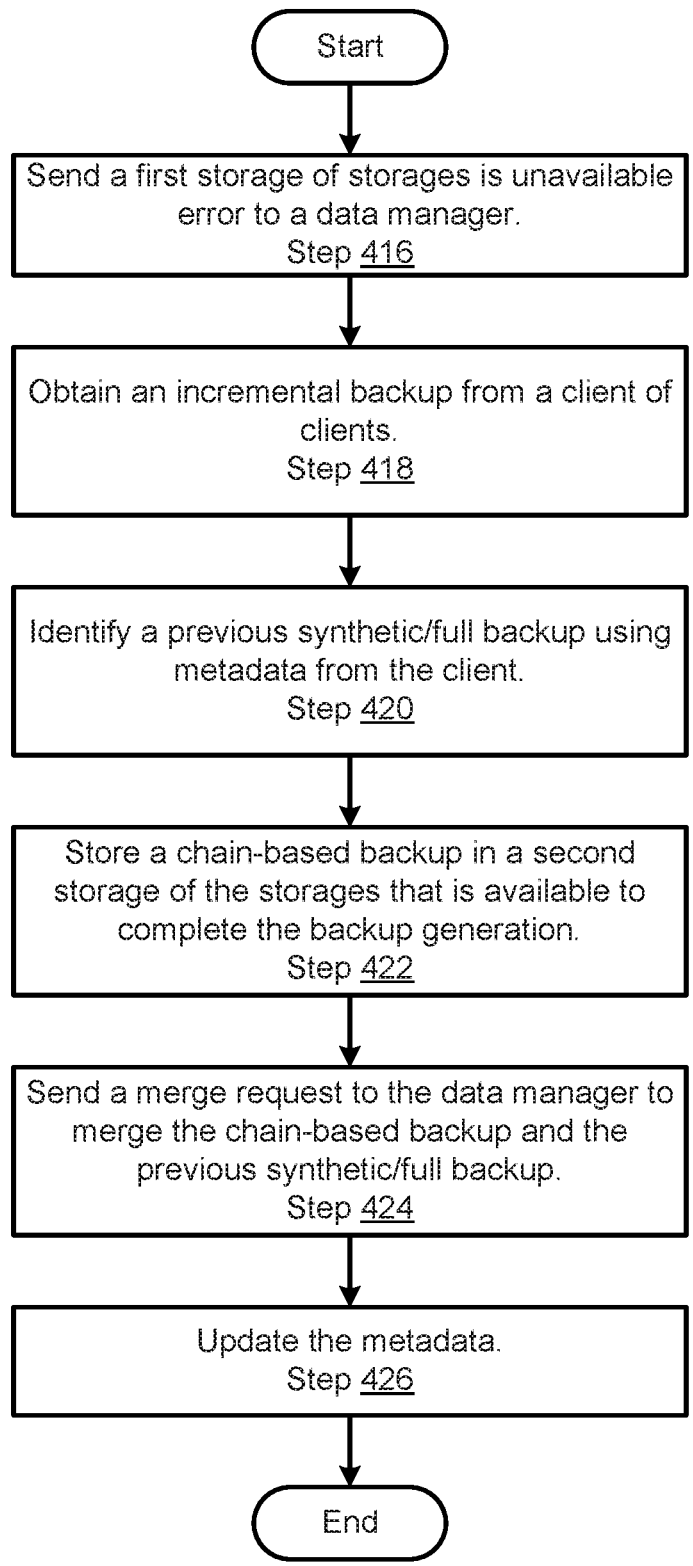
FIG. 4C shows a flowchart of a method of storing a chain-based backup in accordance with one or more embodiments of the invention.

As discussed above, a chain-based backup may be stored in a second storage that is available using the method illustrated in FIG. 4A. FIG. 4C shows a flowchart of a method in accordance with one or more embodiments of the invention. The method depicted in FIG. 4C may be used to store a chain-based backup in accordance with one or more embodiments of the invention. The method shown in FIG. 4C may be performed by, for example, a manager (e.g., 130, FIG. 1). Other components of the system illustrated in FIG. 1 may perform all, or a portion, of the method of FIG. 4C without departing from the invention.

While FIG. 4C is illustrated as a series of steps, any of the steps may be omitted, performed in a different order, additional steps may be included, and/or any or all of the steps may be performed in a parallel and/or partially overlapping manner without departing from the invention.

In step 416, a first storage of storages sends an unavailable error to a data manager.

The first storage may be unavailable when the manager requests to store a backup in the first storage. In response to the manager's request, the first storage may send a storage unavailable error message to the data manager. The first storage may notify the data manager via other and/or additional methods without departing from the invention.

In step 418, an incremental backup is obtained from a client of clients.

In response to the first storage unavailable error message, the data manager may send a request message for an incremental backup from the client. In response to the request, the client may send an incremental backup to the manager. The incremental backup may be generated by the client and then sent to data manager. The incremental backup may be obtained from a client of clients via other and/or additional methods without departing from the invention.

In step 420, a previous synthetic or full backup is identified using metadata from the client.

In one or more embodiments of the invention, the data manager identifies a previous synthetic or full backup using the metadata that is related to the incremental backup (e.g., the incremental backup is associated with a period of time following a point in time associated with the identified full/synthetic backup). Due to the unavailability of the first storage, the manager may request the previous backup metadata from the client. When the client generates backups, the clients may retain metadata regarding generated backups. The client may send the previous backup metadata to the data manager. The previous backup metadata may include information regarding the previous backup. The backup metadata information may include the backup location, backup type, backup timestamp, and other and/or additional information regarding the previous backup without departing from the invention. The previous synthetic or full backup may be identified via other and/or additional methods without departing from the invention. For example, metadata may be duplicated to other locations to reduce its susceptibility to data loss events.

In step 422, a chain-based backup is stored in a second storage of the storages that is available to complete the backup generation.

In response to the first storage being unavailable, the data manager may request to store a backup in a second storage of storages. The second storage may be available. The data manager may request to store a backup in any number of storages to store a backup in a storage that is available. If the second storage is available, the second storage may send a storage available message to the data manager. The second available storage may be identified via other and/or additional methods without departing from the invention.

Due to unavailability of the first storage, the data manager may not be able to generate a synthetic backup because the previous synthetic or full backup is also unavailable. In response, a chain-based backup may be generated. As discussed above, an incremental backup and previous backup metadata may be obtained by the data manager from the client. A chain-based backup may be generated by chaining the incremental backup to the previous synthetic or full backup using the previous backup metadata. For example, the data manager may use the backup location and timestamp of the previous backup contained in the metadata to chain an incremental backup to the unavailable previous backup. Chaining the incremental backup to a previous backup may include mapping the changes in the incremental backup to the previous backup. The incremental backup may be chained to the previous backup via other and/or additional methods without departing from the invention. The chain-based backup may be generated via other and/or additional methods without departing from the invention.

In step 424, a merge request is sent to the data manager to merge the chain-based backup and the previous synthetic or full backup.

The data manager may process merge requests when storages that are unavailable become available. Consequently, the chain-based backup may be merged with the previous backup when the first storage becomes available again. The chain-based backup may not be able to merge with the previous backup while the first storage containing the previous backup is unavailable. While the first storage is unavailable, the data manager may send a merge request to the data manager. The request may include having the data manager merge the chain-based backup with the previous backup to generate a synthetic backup when the first storage becomes available again. There may be multiple chain-based backups generated and stored in a second available storage.

The data manager may maintain a queue of merge requests that may contain any number of merge requests. The queue may be, for example, a first in first out queue, where the first merge request stored in the queue is first request the data manager selects to merge. The queue may be other types of queues without departing from the invention (e.g., a listing of merge requests). The merge requests may be sent to the data manager to merge the chain-based backup and the previous synthetic or full backup via other and/or additional methods without departing from the invention.

In step 426, the metadata is updated to include information regarding the newly generated and stored chained-based backup.

In one or more embodiments of the invention, the metadata is updated to include information regarding the newly generated chain-based backups. The manager may write the information of the chain-based backup to the metadata stored in the persistent storage of the manager. The metadata may include the location, timestamp, backup type, and/or backup size of the newly generated chain-based backup. The metadata may include other information regarding the newly generated chain-based backup without departing from the invention. The metadata may be updated via other and/or additional methods without departing from the invention.

The method may end following step 426.

Figure 4D:
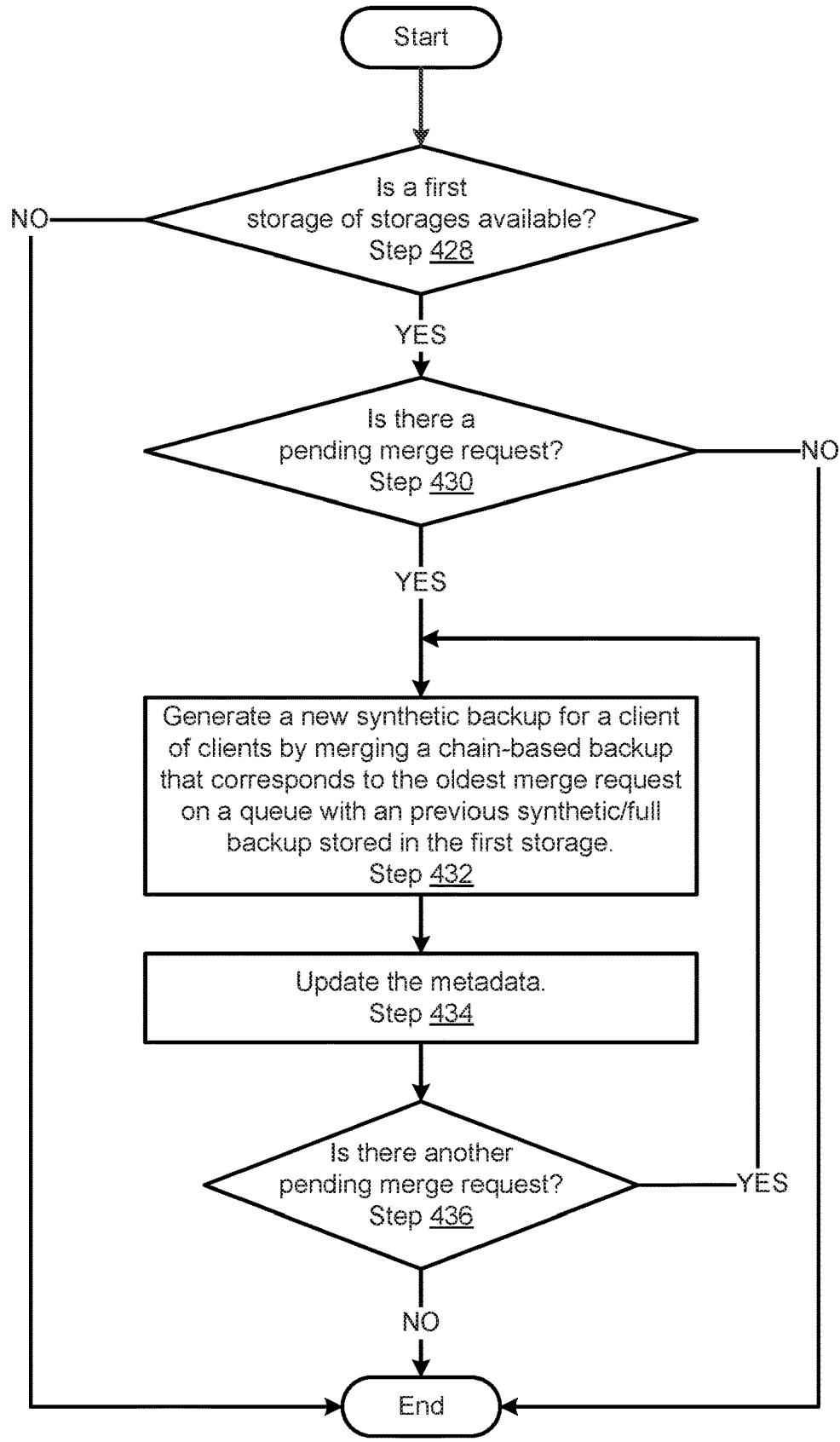
FIG. 4D shows a flowchart of a method of merging a chain-based backup with a previous backup in accordance with one or more embodiments of the invention.

As discussed above, a chain-based backup may be merged with a previous backup when the first storage becomes available using the method illustrated in FIG. 4C. FIG. 4D shows a flowchart of a method in accordance with one or more embodiments of the invention. The method depicted in FIG. 4D may be used to merge a chain-based backup with a previous backup to generate a synthetic backup in accordance with one or more embodiments of the invention. The method shown in FIG. 4D may be performed by, for example, a manager (e.g., 130, FIG. 1). The method shown in FIG. 4D may be performed in parallel to the synthetic backups process (420) shown in FIG. 4A and the method shown in FIG. 4B. Other components of the system illustrated in FIG. 1 may perform all, or a portion, of the method of FIG. 4D without departing from the invention.

While FIG. 4D is illustrated as a series of steps, any of the steps may be omitted, performed in a different order, additional steps may be included, and/or any or all of the steps may be performed in a parallel and/or partially overlapping manner without departing from the invention.

In step 428, it is determined whether a first storage of storages is available.

In one or more embodiments of the invention, the determination is made by the data manager sending a request to store a backup in a storage. The storage may send a message to the manager in response notifying the manager of the status of the storage's availability. The availability of the storage may be determined via other and/or additional methods without departing from the invention.

The determination may be made by the manager when attempting to access the storage. The manager may attempt to access storage space to write the initiated backup into or attempt to access an existing backup in the storage. But when attempting to access the storage, the manager may receive a flag that the storage is unavailable. In contrast, the manager may be able to access the storage or previous backup, and the storage may be determined to be available.

If the storage is determined to be available, the method may proceed to step 430. If the storage is determined to be unavailable, the method may end following step 428.

In step 430, it is determined whether a merge request is pending.

In one or more embodiments of the invention, it is determined that there is a pending merge request by the data manager checking a queue for merge requests. As discussed above the data manager may maintain a queue of pending merge requests. The data manager may attempt to access a pending merge request in the queue. The queue may be empty, and a queue empty flag may be set to notify the data manager that there are no pending merge requests. It may be determined that there is a pending merge request via other and/or additional methods without departing from the invention.

If it is determined that there is a pending merge request, the method may proceed to step 432. If it is determined that there are no pending merge requests, the method may end following step 430.

In step 432, a new synthetic backup is generated for a client of clients by merging a chain-based backup that corresponds to the oldest merge request in a queue with a previous full or synthetic backup stored in the first storage.

As noted above, a chain-based backup may be stored in a second storage that is available. The previous synthetic or full backup may now be available since the first storage which the backup is stored is now available. By merging the chain-based backup with the previous synthetic or full backup, the manager may generate a new synthetic backup. The new synthetic backup may include all of the data from the previous synthetic or full backup and all of the changes since the previous synthetic or full backup was generated (i.e. the chain-based backup). The manager may merge an incremental backup with a synthetic backup by writing the changes included in the incremental backup of the chain-based backup into the previous backup. The manager may merge the chain-based backup with a previous backup via other and/or additional methods without departing from the invention. A synthetic backup may be generated via other and/or additional methods without departing from the invention.

In step 434, the metadata is updated to include information regarding the newly generated and stored synthetic backup from the merging of the chain-based backup and the previous backup.

In one or more embodiments of the invention, the metadata is updated to include information regarding the newly generated synthetic backup. The manager may write the information regarding the synthetic backup to the metadata stored in the persistent storage of the manager. The metadata may include the location, timestamp, backup type, and/or backup size of the newly generated synthetic backup including the chain-based backup and previous backup used to generate it. The metadata may include other information regarding the newly generated chain-based backup without departing from the invention. The metadata may be updated via other and/or additional methods without departing from the invention.

In step 436, it is determined whether there is another pending merge request.

In one or more embodiments of the invention, it is determined that there is a pending merge request by the data manager checking a queue for merge requests. As discussed above the data manager may maintain a queue of pending merge requests. The data manager may attempt to access a pending merge request in the queue. The queue may be empty, and a queue empty flag may be set to notify the data manager that there are no pending merge requests. It may be determined that there is a pending merge request via other and/or additional methods without departing from the invention.

If it is determined that there is a pending merge request, the method may proceed to step 432. The method may repeat steps 432, 434, and 436 while there are pending merge requests in the queue. If it is determined that there is no pending merge request, the method may end following step 436.

Thus, via steps 432-434, any number of chain-based backups may be merged to generate corresponding synthetic backups. The process may start with the oldest chain-based backup and end with the newest chain-based backup.

Figure 5A:
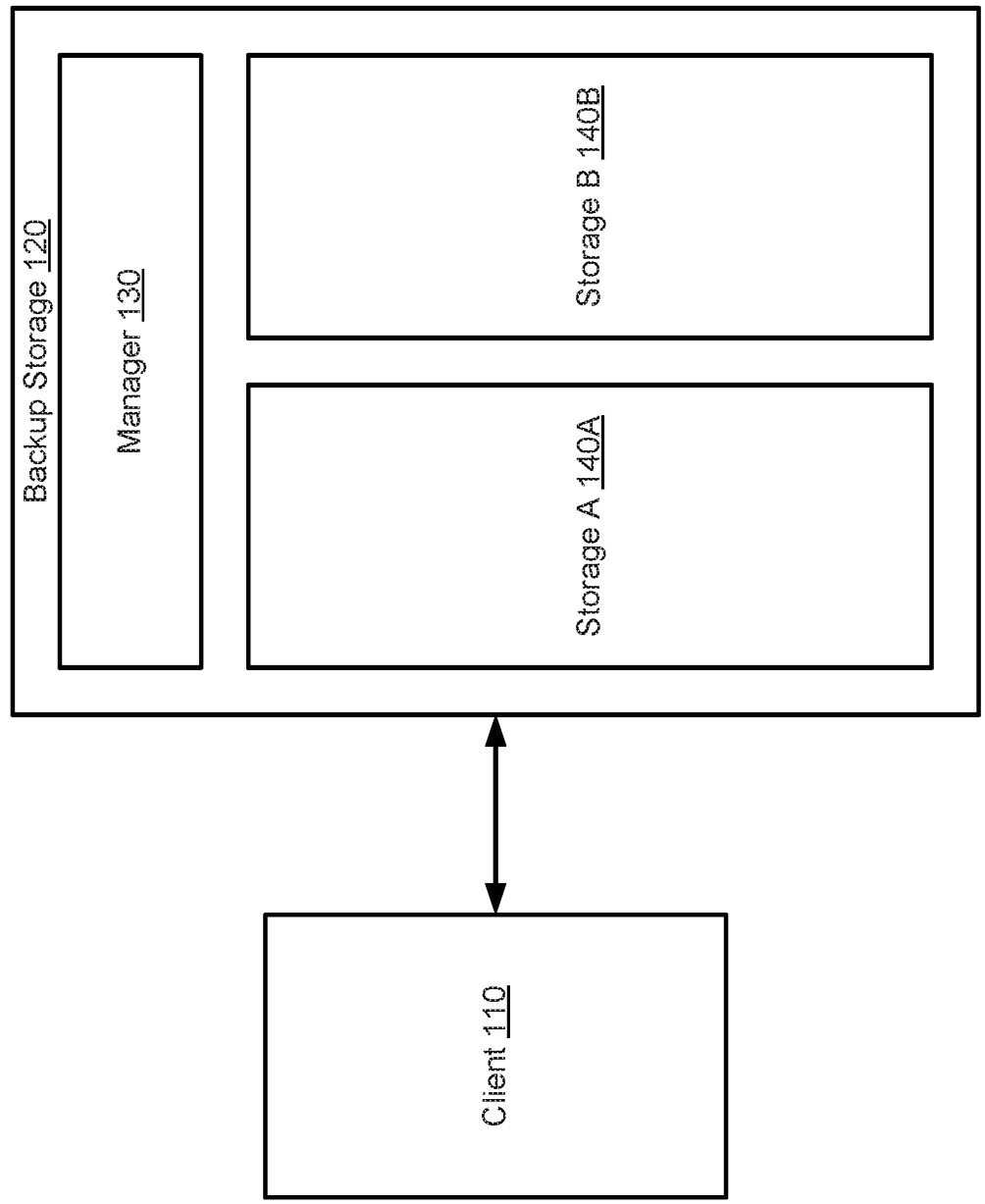
FIG. 5A show a diagram of an example system.
Figure 5D:
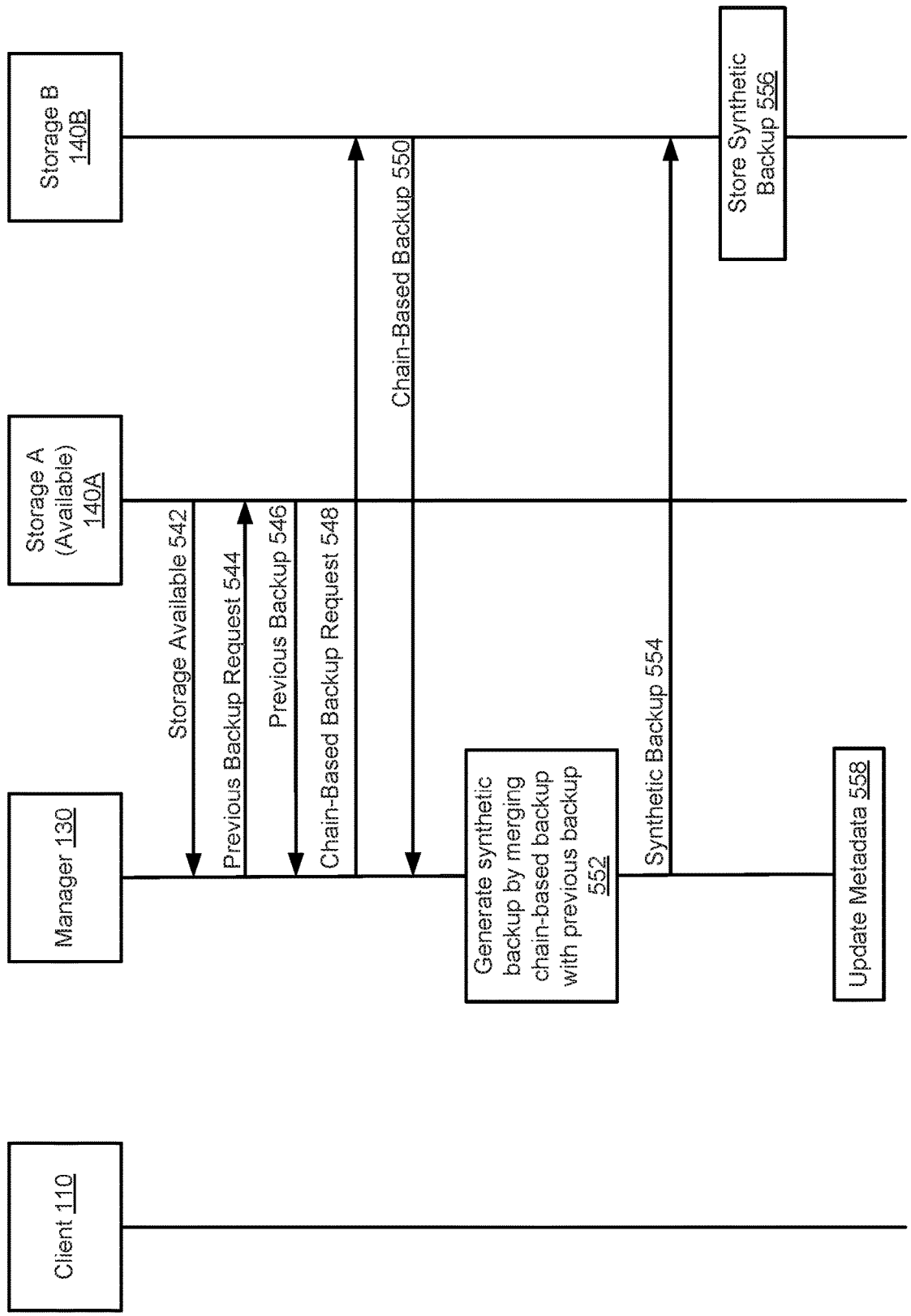

To further clarify aspects of embodiments of the invention, a nonlimiting example is provided in FIGS. 5A-5D. FIG. 5A shows a diagram of an example system and FIGS. 5B-5D shows a diagram of actions that may be performed by the example system of FIG. 5A. The system of FIG. 5A may be similar to that of FIG. 1. For the sake of brevity, only a limited number of components of the system of FIG. 1 are illustrated in FIG. 5A.

Example

Consider a scenario as illustrated in FIG. 5A in which a backup storage (120) is providing data backup storage services for a client (110). The backup storage may have a manager (130) that is orchestrating the data backup storage services and two storages, storage A (140A) and storage B (140B), that provide data storage services.

To provide such services, the client (110) may request to store a backup in the backup storage (120). FIG. 5B shows an interaction diagram between the client (110), the manager (130), storage A (140A), and storage B (140B).

At a first point in time, the client (110) sends a storage request (500) to the manager (130). When the manager (130) receives the storage request (500), the manager (130) sends a storage request (502) to a first storage, storage A (140A). Storage A (140A) is available, and in response to the storage request (502), storage A (140A) sends a storage available (504) message to the manager (130) to notify the manager (130) storage A (140A) is available. After the manager (130) receives the storage available (504) message, the manager (130) sends a storage available message (506) to the client (110) to notify the client (110) that storage A (140A) is available.

After receiving the storage available (506) message, the client (110) sends an incremental backup (508) to the manager (130). Storage A (140A) then sends a previous backup (510) to the manager (130). Storage A (140A) may send the previous backup (510) to the manager (130) prior to the manager (130) sending the storage available (506) message to the client (110) and prior to the manager (130) obtaining the incremental backup (508) from the client (110) without departing from the invention. After the manager (130) receives the incremental backup (508) from the client (110) and the previous backup (510) from storage A (140A), the manager (130) generates a synthetic backup (512). The manager (130) then sends the synthetic backup (514) to storage A (140). Once storage A (140) receives the synthetic backup (514), the synthetic backup is stored (516) in storage A (140A). After the synthetic backup is stored (516) in storage A (140A) the manager (130) updates the metadata (518) to include information regarding the aforementioned synthetic backup.

After the first backup generation is complete, the client (110) may request to store another backup, but storage A (140A) may be unavailable. FIG. 5C shows a second interaction diagram between the client (110) the manager (130), storage A (140A) and storage B (140B).

To initiate the generation of another backup, the client (110) may send a storage request (520) to the manager (130). Once the manager (130) receives the storage request (520) from the client (110), the manager (130) sends a storage request (522) to storage A (140A). Storage A (140A) may be unavailable at the time it receives the storage request (522) from the manager (130). In response to the storage request (522), storage A (140A) may send a storage unavailable (524) message to the manager (130). After receiving the storage unavailable message (524), the manager (130) sends a storage unavailable (526) message to the client (110). In response to the storage unavailable (526) message from the manager (130), the client (110) sends an incremental backup (528) and the previous backup metadata (530) to the manager (130).

Once the manager (130) receives the previous backup metadata (530) and the incremental backup (528), the manager (130) generates a chain-based backup (532). After manager (130) generates the chain-based backup (532), the manager (130) sends the chain-based backup (534) to storage B (140B). When storage B (140B) receives the chain-based backup (534), storage B (140B) stores the chain-based backup (536). After the chain-based backup (534) is sent to storage B (140B), the manager (130) queues a merge request (538). After the manager (130) queues the merge request (538), the manager (130) updates the metadata (540).

Once the metadata is updated (540), storage A (140A) may become available and the manager (130) may generate a synthetic backup using the chain-based backup and a previous backup. FIG. 5D shows an interaction diagram between a client (110), and a manager (130), storage A (140B), and storage B (140B) of a backup storage.

Storage A (140A) sends a storage available (542) message to the manager (130). After receiving the storage available (542) message, the manager (130) sends a previous backup request (544) to storage A (140A). In response to the previous backup request (544), storage A (140A) sends the previous backup (546) to the manager (130). After the receiving the storage available (542) message, the manager (130) also sends a chain-based backup request (548) to storage B (140B). In response to the chain-based backup request (548), storage B (140B) sends the chain-based backup (550) to the manager (130). After receiving the storage available message, the manager (130) may go about obtaining the previous backup (544 and 546) and the chain-based backup (548 and 550) in any order. Once the manager (130) obtains both the previous backup (546) and the chain-based backup (550), the manager (130) generates a synthetic backup by merging the chain-based backup with the previous backup (552). The manager (130) then sends the synthetic backup (554) to storage B (140B). After receiving the synthetic backup (554), storage B stores the synthetic backup (556). After the synthetic backup is stored (556), the manager (130) updates the metadata (558) to include information regarding the newly generated synthetic backup.

End of Example

Thus, as illustrated in FIGS. 5A-5D, embodiments of the invention may provide a method for managing a backup storage system that may have temporarily unavailable storages. By managing such backup storage systems, temporarily unavailable storages may be addressed. Consequently, the impact of the potential temporary unavailability of storages may be reduced.

Figure 6:
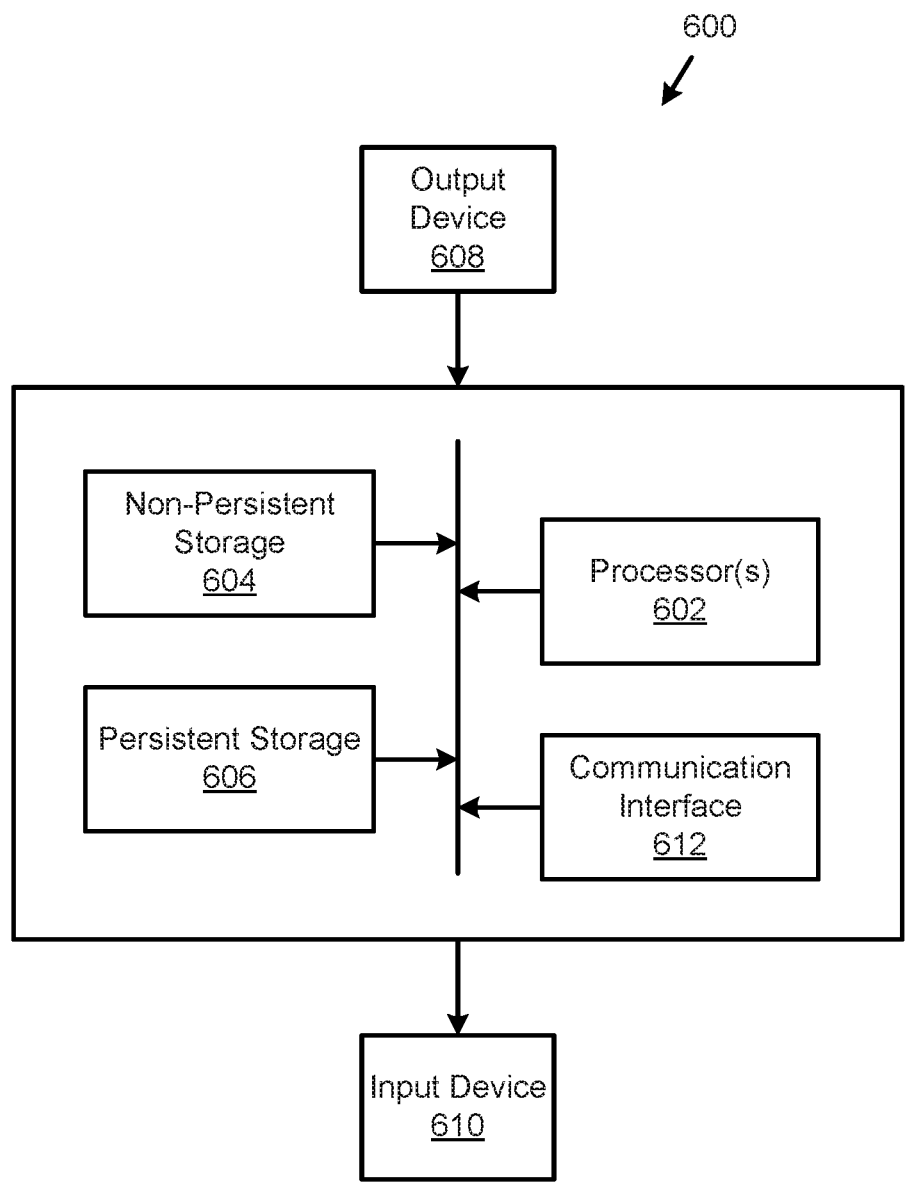
FIG. 6 shows a diagram of a computing device in accordance with one or more embodiments of the invention.

As discussed above, embodiments of the invention may be implemented using computing devices. FIG. 6 shows a diagram of a computing device in accordance with one or more embodiments of the invention. The computing device (600) may include one or more computer processors (602), non-persistent storage (604) (e.g., volatile memory, such as random access memory (RAM), cache memory), persistent storage (606) (e.g., a hard disk, an optical drive such as a compact disk (CD) drive or digital versatile disk (DVD) drive, a flash memory, etc.), a communication interface (612) (e.g., Bluetooth interface, infrared interface, network interface, optical interface, etc.), input devices (610), output devices (608), and numerous other elements (not shown) and functionalities. Each of these components is described below.

In one embodiment of the invention, the computer processor(s) (602) may be an integrated circuit for processing instructions. For example, the computer processor(s) may be one or more cores or micro-cores of a processor. The computing device (600) may also include one or more input devices (610), such as a touchscreen, keyboard, mouse, microphone, touchpad, electronic pen, or any other type of input device. Further, the communication interface (612) may include an integrated circuit for connecting the computing device (600) to a network (not shown) (e.g., a local area network (LAN), a wide area network (WAN) such as the Internet, mobile network, or any other type of network) and/or to another device, such as another computing device.

In one embodiment of the invention, the computing device (600) may include one or more output devices (608), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (602), non-persistent storage (604), and persistent storage (606). Many different types of computing devices exist, and the aforementioned input and output device(s) may take other forms.

Embodiments of the invention may provide a computationally efficient method of managing temporarily unavailable storages in a backup storage system. By managing such temporarily unavailable storages, the temporal unavailability of storages may be remediated to reduce the impact of such temporarily unavailable storages of a backup storage system.

To manage temporarily unavailable storages of a backup storage system, embodiments of the invention may utilize a multiphase backup storage process. In a first phase, the method may initiate a backup generation and determine that a first storage of a backup storage system is available. After determining the first storage is available, first type of backup may be stored in the first storage. If it is determined that the first storage is temporarily unavailable, the process may proceed to the second phase. In the second phase, a second storage of the backup storage that is available is identified. After the second storage that is available is identified, a second type of backup that is chained to a previous backup on the temporarily unavailable first storage is stored on the second available storage. After the first storage becomes available again, the second type of backup stored on the second storage is converted into the first type of backup by merging the previous backup with the second type of backup and is stored in the second storage. This multiphase backup storage process may use less storage space, less memory space, use fewer processor cycles to generate backups, etc. By doing so, embodiments of the invention may provide methods and systems for managing temporarily unavailable storages at a lower computational cost than contemporary methods.

Thus, embodiments of the invention may address the problem of limited computational resource availability by decreasing the computational cost of for storing backups in a backup storage system with temporarily unavailable storages.

The problems discussed above should be understood as being examples of problems solved by embodiments of the invention disclosed herein and the invention should not be limited to solving the same/similar problems. The disclosed invention is broadly applicable to address a range of problems beyond those discussed herein.

One or more embodiments of the invention may be implemented using instructions executed by one or more processors of the data management device. Further, such instructions may correspond to computer readable instructions that are stored on one or more non-transitory computer readable mediums.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A manager of a backup storage system, comprising:
persistent storage for storing metadata that associates clients with storages, wherein the metadata specifies that a backup for a client of the clients is stored on a first storage, wherein the backup storage system comprises the manager, the first storage, and a second storage; and a data manager programmed to:
  initiate, using the metadata, a backup generation for the client of the clients, wherein initiating the backup generation comprises sending a message to an agent on the client to initiate generation of an incremental backup;
  obtain the incremental backup from the agent;
  after the backup is initiated, make a determination that the first storage is unavailable; and
  in response to the determination:
    obtain an identity of a previous backup from the client, wherein the previous backup is one selected from a group consisting of a full backup and a synthetic backup;
    generate a chain-based backup using the incremental backup and the identity of the previous backup; and
    store the chain-based backup for the client in the second storage of the storages.

2. The manager of claim 1, wherein no other backups for the client are stored to complete the backup generation.

3. The manager of claim 1, wherein the data manager is further programmed to:
  make a second determination, after storing the chain-based backup, that the first storage is available;
  in response to the second determination:
    generate a new synthetic backup for the client by merging the chain-based backup with a backup stored in the first storage.

4. The manager of claim 3, wherein the backup is a full backup.

5. The manager of claim 4, wherein the full backup is based on data of the client at a point in time, wherein the chain-based backup is based on changes to the data of the client over a period of time.

6. The manager of claim 3, wherein the backup is an existing synthetic backup.

7. The manager of claim 6, wherein the existing synthetic backup is based on an existing full backup and an existing chain-based backup.

8. A method for operating a manager of a backup storage system, comprising:
  initiating, using metadata, a backup generation for a client of clients, wherein initiating the backup generation comprises sending a message to an agent on the client to initiate generation of an incremental backup, wherein the metadata specifies that a backup for the client of the clients is stored on a first storage, wherein the backup storage system comprises the manager, the first storage, and a second storage;
  obtaining the incremental backup from the agent;
  after initiating the backup, making a determination that the first storage is unavailable;
  in response to the determination:
    obtaining an identity of a previous backup from the client, wherein the previous backup is one selected from a group consisting of a full backup and a synthetic backup;
    generating a chain-based backup using the incremental backup and the identity of the previous backup; and
    storing the chain-based backup for the client in the second storage of the storages.

9. The method of claim 8, wherein no other backups for the client are stored to complete the backup generation.

10. The method of claim 8, further comprising:
  making a second determination, after storing the chain-based backup, that the first storage is available;
  in response to the second determination:
    generating a new synthetic backup for the client by merging the chain-based backup with a backup stored in the first storage.

11. The method of claim 10, wherein the backup is a full backup.

12. The method of claim 11, wherein the full backup is based on data of the client at a point in time, wherein the chain-based backup is based on changes to the data of the client over a period of time.

13. The method of claim 10, wherein the backup is an existing synthetic backup.

14. The method of claim 13, wherein the existing synthetic backup is based on an existing full backup and an existing chain-based backup.

15. A non-transitory computer readable medium comprising computer readable program code, which when executed by a computer processor enables the computer processor to perform a method for operating a manager for a backup storage system, the method comprising:
  initiating, using metadata, a backup generation for a client of clients, wherein initiating the backup generation comprises sending a message to an agent on the client to initiate generation of an incremental backup, wherein the metadata specifies that a backup for the client of the clients is stored on a first storage, wherein the backup storage system comprises the manager, the first storage, and a second storage;
  obtaining the incremental backup from the agent;
  after initiating the backup, making a determination that the first storage is unavailable;
  in response to the determination:
    obtaining an identity of a previous backup from the client, wherein the previous backup is one selected from a group consisting of a full backup and a synthetic backup;
    generating a chain-based backup using the incremental backup and the identity of the previous backup;
    storing the chain-based backup for the client in a second storage of the storages.

16. The non-transitory computer readable medium of claim 15, wherein no other backups for the client are stored to complete the backup generation.

17. The non-transitory computer readable medium of claim 15, wherein the method further comprises:
  making a second determination, after storing the chain-based backup, that the first storage is available;
  in response to the second determination:
    generating a new synthetic backup for the client by merging the chain-based backup with a backup stored in the first storage.

18. The non-transitory computer readable medium of claim 17, wherein the backup is a full backup.

19. The non-transitory computer readable medium of claim 18, wherein the full backup is based on data of the client at a point in time, wherein the chain-based backup is based on changes to the data of the client over a period of time.

20. The non-transitory computer readable medium of claim 17, wherein the backup is an existing synthetic backup.

* * * * *